(12) United States Patent
Farris et al.

(10) Patent No.: US 11,331,241 B2
(45) Date of Patent: May 17, 2022

(54) LEGGED MOBILITY EXOSKELETON DEVICE WITH ENHANCED ACTUATOR MECHANISM EMPLOYING MAGNETIC COUPLING

(71) Applicant: Parker-Hannifin Corporation, Cleveland, OH (US)

(72) Inventors: Ryan Farris, Solon, OH (US); Steven Etheridge, Macedonia, OH (US); Scott Morrison, Macedonia, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 629 days.

(21) Appl. No.: 16/338,885

(22) PCT Filed: Jan. 17, 2018

(86) PCT No.: PCT/US2018/013992
§ 371 (c)(1),
(2) Date: Apr. 2, 2019

(87) PCT Pub. No.: WO2018/147981
PCT Pub. Date: Aug. 16, 2018

(65) Prior Publication Data
US 2021/0338515 A1    Nov. 4, 2021

Related U.S. Application Data

(60) Provisional application No. 62/456,305, filed on Feb. 8, 2017.

(51) Int. Cl.
*A61H 3/00* (2006.01)
*B25J 9/00* (2006.01)

(52) U.S. Cl.
CPC .............. *A61H 3/00* (2013.01); *B25J 9/0006* (2013.01); *A61H 2201/0107* (2013.01);
(Continued)

(58) Field of Classification Search
CPC ...... A61F 5/00; A61F 5/01; A61F 5/37; A61F 5/3715; A61F 5/0193; A61F 5/058;
(Continued)

(56) References Cited

U.S. PATENT DOCUMENTS 4,332,037 A * 6/1982 Esformes .............. A61F 2/4241
623/18.12
5,092,320 A   3/1992 Maurer
(Continued)

FOREIGN PATENT DOCUMENTS

DE    102011054956 A1    5/2013
GB          2512074 A     9/2014
(Continued)

OTHER PUBLICATIONS

International Search Report and Written Opinion of PCT/US2018/013992 dated Apr. 25, 2018.

*Primary Examiner* — Samchuan C Yao
*Assistant Examiner* — Nathan M Le
(74) *Attorney, Agent, or Firm* — Renner, Otto, Boisseile & Sklar, LLP

(57) ABSTRACT

A joint actuator assembly includes a motor, a rotating driving member driven by the motor for driving a driven component, and a transmission assembly located between the motor and the rotating driving member that provides speed reduction from the motor to the rotating driving member. The rotating driving member comprises a magnetic coupling including a plurality of magnetic elements that are configured to magnetically couple with an opposing magnetic coupling of the driven component. The actuator and driven component may be combined into a mobility device including a magnetic coupling system having a first magnetic coupling on the actuator that magnetically couples to a second magnetic coupling on the driven component. The magnetic coupling system includes plurality of magnetic elements located as part of one or both of the first and second magnetic couplings. The first and second couplings have opposing mating surfaces that join together in a coupled position.

11 Claims, 16 Drawing Sheets

(52) U.S. Cl.
CPC .............. *A61H 2201/1215* (2013.01); *A61H 2201/1463* (2013.01); *A61H 2201/164* (2013.01); *A61H 2201/165* (2013.01); *A61H 2201/1673* (2013.01); *A61H 2205/102* (2013.01)

(58) Field of Classification Search
CPC .... A61F 5/05841; A61F 5/0585; A61F 5/048; A61F 5/0102; A61F 5/0123; A61F 5/0125; A61H 1/02; A61H 1/0218; A61H 1/026; A61H 1/00; A61H 1/0237; A61H 1/024; A61H 1/0244; A61H 1/0262; A61H 1/0266; A61H 1/0277–0288; A61H 2001/0203; A61H 2001/0248; A61H 2001/0251; A61H 2001/027; A61H 2003/006–007; A61H 3/00; B25J 9/0006
See application file for complete search history.

(56) References Cited

U.S. PATENT DOCUMENTS

| | | | |
|---|---|---|---|
| 5,879,386 A * | 3/1999 | Jore | A61F 2/80 623/16.11 |
| 6,517,503 B1 * | 2/2003 | Naft | A61F 5/0125 600/592 |
| 7,033,400 B2 | 4/2006 | Currier | |
| 8,915,874 B2 | 12/2014 | Schilling | |
| 2006/0142105 A1 * | 6/2006 | Kudoh | F16H 1/36 475/10 |
| 2008/0108918 A1 * | 5/2008 | Joutras | A61H 1/0277 601/34 |
| 2009/0233720 A1 * | 9/2009 | Shim | B25J 17/0208 464/38 |
| 2013/0253393 A1 * | 9/2013 | Schilling | A61F 5/0102 602/5 |
| 2014/0142475 A1 * | 5/2014 | Goldfarb | A61H 3/00 601/35 |
| 2015/0081036 A1 * | 3/2015 | Nakanishi | A61H 1/0285 623/24 |
| 2015/0142130 A1 * | 5/2015 | Goldfarb | A61H 1/024 623/25 |
| 2015/0374573 A1 * | 12/2015 | Horst | A61H 3/00 602/16 |
| 2016/0038314 A1 | 2/2016 | Kuiken et al. | |
| 2019/0214883 A1 * | 7/2019 | Klassen | B25J 9/126 |

FOREIGN PATENT DOCUMENTS

| | | |
|---|---|---|
| JP | 2008221393 A | 9/2008 |
| WO | WO 2015/3633 | 10/2015 |

* cited by examiner

LEGGED MOBILITY EXOSKELETON DEVICE WITH ENHANCED ACTUATOR MECHANISM EMPLOYING MAGNETIC COUPLING

RELATED APPLICATION DATA

This application is a national stage application pursuant to 35 U.S.C. § 371 of PCT/US2017/013992 filed on Jan. 17, 2018, which claims the benefit of U.S. Provisional Application No. 62/456,305 filed Feb. 8, 2017, the contents of which are which is incorporated herein by reference.

FIELD OF INVENTION

The present invention relates to movement assist devices, such as a legged mobility device or "exoskeleton" device, and more particularly to drive mechanisms and coupling components for driving the joint components of such devices.

BACKGROUND OF THE INVENTION

There are currently on the order of several hundred thousand spinal cord injured (SCI) individuals in the United States, with roughly 12,000 new injuries sustained each year at an average age of injury of 40.2 years. Of these, approximately 44% (approximately 5300 cases per year) result in paraplegia. One of the most significant impairments resulting from paraplegia is the loss of mobility, particularly given the relatively young age at which such injuries occur. Surveys of users with paraplegia indicate that mobility concerns are among the most prevalent, and that chief among mobility desires is the ability to walk and stand. In addition to impaired mobility, the inability to stand and walk entails severe physiological effects, including muscular atrophy, loss of bone mineral content, frequent skin breakdown problems, increased incidence of urinary tract infection, muscle spasticity, impaired lymphatic and vascular circulation, impaired digestive operation, and reduced respiratory and cardiovascular capacities.

In an effort to restore some degree of legged mobility to individuals with paraplegia, several lower limb orthoses have been developed. The simplest form of such devices is passive orthotics with long-leg braces that incorporate a pair of ankle-foot orthoses (AFOs) to provide support at the ankles, which are coupled with leg braces that lock the knee joints in full extension. The hips are typically stabilized by the tension in the ligaments and musculature on the anterior aspect of the pelvis. Since almost all energy for movement is provided by the upper body, these passive orthoses require considerable upper body strength and a high level of physical exertion, and provide very slow walking speeds.

The hip guidance orthosis (HGO), which is a variation on long-leg braces, incorporates hip joints that rigidly resist hip adduction and abduction, and rigid shoe plates that provide increased center of gravity elevation at toe-off, thus enabling a greater degree of forward progression per stride. Another variation on the long-leg orthosis, the reciprocating gait orthosis (RGO), incorporates a kinematic constraint that links hip flexion of one leg with hip extension of the other, typically by means of a push-pull cable assembly. As with other passive orthoses, the user leans forward against a stability aid (e.g., bracing crutches or a walker) while un-weighting the swing leg and utilizing gravity to provide hip extension of the stance leg. Since motion of the hip joints is reciprocally coupled through the reciprocating mechanism, the gravity-induced hip extension also provides contralateral hip flexion (of the swing leg), such that the stride length of gait is increased. One variation on the RGO incorporates a hydraulic-circuit-based variable coupling between the left and right hip joints. Experiments with this variation indicate improved hip kinematics with the modulated hydraulic coupling.

To decrease the high level of exertion associated with passive orthoses, the use of powered orthoses has been under development, which incorporate actuators and drive motors associated with a power supply to assist with locomotion. These powered orthoses have been shown to increase gait speed and decrease compensatory motions, relative to walking without powered assistance. The use of powered orthoses presents an opportunity for electronic control of the orthoses, for enhanced user mobility.

An example of the current state of the art of exoskeleton devices is shown in Applicant's co-pending International Application Serial No. PCT/US2015/23624, entitled "Wearable Robotic Device," filed 31 Mar. 2015. Such device is representative of an effective and generally user friendly exoskeleton device. There is a general concern with exoskeleton devices that they be compact and light weight. Device users typically have significant physical impairments, and reducing the size and weight of exoskeleton devices makes them easier to don and otherwise manipulate. With increased ease, users can experience more freedom of mobility, and can reduce the need for outside caregivers and assistance.

The drive mechanism for the joint components is one aspect of exoskeleton devices that is a continuing subject of concern for rendering exoskeleton devices more compact and light weight. Reduced size and weight must be balanced with performance so as to provide a device that is more user friendly to don and manipulate, while still providing adequate torque and driving forces for operation of the exoskeleton device.

In a recent survey of 354 wheelchair users and 127 healthcare professionals "ease of putting on and taking off the device" was rated as "very important", and "portability of the device" was rated as "important", (Wolff et al, A Survey of Stakeholder Perspectives on Exoskeleton Technology, JNER 2014.) Conventional legged mobility devices often incorporate two full leg braces or leg components rigidly connected to a common hip brace or hip component. This conventional arrangement of a lower leg, upper leg, and hip components will generally articulate at each knee joint and each hip joint, making the device cumbersome to handle when it is being worn by a user. Additionally, the weight of each segment may be significant, particularly if actuation and batteries are incorporated.

To address the cumbersome nature of a fully assembled legged mobility device, such a system may be designed with modular components that are handled separately and are connected together during the donning process. In a modular system, ease of donning/doffing and portability become significant issues. Furthermore, as referenced above, device users who might benefit from a powered orthosis suffer from significant mobility impairments, which not only inhibit volitional leg movement but also impair trunk and/or upper extremity function. Such impairments often impede a user's ability to achieve independent donning and doffing without assistance of a caregiver, which is undesirable.

SUMMARY OF THE INVENTION

The present invention is directed to movement assist devices such as powered limb or gait orthoses or wearable robotic legged mobility devices or "exoskeletons," and more particularly to coupling mechanisms and drive mechanisms for driving the joint components of such devices. An aspect of the invention is an actuator assembly that includes an enhanced magnetic coupling system, which enables easy, one-handed coupling of a driven component to a rotational driving member of the actuator assembly.

In exemplary embodiments, the rotational driving member may be an output reel of a cable reel assembly that is part of the actuator assembly. In particular, the cable reel assembly may constitute a final stage of a multi-stage speed reduction transmission portion of the actuator assembly. This output reel may include a plurality of recessed pockets (e.g., six recessed pockets in an exemplary embodiment), with one or more of the pockets having a cylindrical neodymium disc magnet installed in the bottom of the recessed pocket. The driven component, which may be a contoured plastic orthotic section which contours and attaches to the lower leg of a human wearer, may include a coupling portion having mating raised features that essentially match the recessed pockets of the rotational driving member or output reel. These raised mating features may include embedded cylindrical neodymium disc magnets that couple to the magnetic discs in the recessed pockets of the output reel.

During assembly of the legged mobility device (i.e. donning), when the coupling portion of the driven component is placed in proximity to the rotational driving member or output reel, the magnetic attraction draws the two components together, and the raised mating features of the coupling portion of the driven component become mechanically engaged in the recessed pockets of the rotational driving member. Once the two components are drawn together by magnetic coupling, a mechanical interface of a mating surface of the raised mating features of the driven component against an opposing mating surface of the recessed pockets of the rotational driving member handles the torque loads applied to the actuator assembly. Accordingly, although the magnetic coupling aids in donning, the principal torque accommodation is performed by the mechanical interface of the two opposing mating surfaces. The mechanical interface of the recessed pockets and the raised mating features further may have matching steps or tapers (e.g., of approximately 15 degrees relative to normal) which further eases alignment.

To further enhance the self-aligning capability of the magnetic coupling system, the magnetic elements in each of the rotational driving member and the driven component may be installed with alternating polarity. In other words, a first magnetic element may be installed in the rotational driving member with the north pole facing out; a next adjacent magnetic element may be installed with the south pole facing out; and so on in alternating fashion. The coupling portion of the driven component similarly would have magnetic elements installed with alternating polarity, and of opposite polarity relative to the magnetic elements of the recesses to achieve the magnetic coupling. In this way, the magnetic coupling system has magnetic keying that actively forces the two components apart if the user is attempting to make the coupling in the wrong alignment of the actuator assembly relative to the driven component.

In an exemplary embodiment, the six magnetic connections each have a holding force of approximately six pounds, for a total coupling force of approximately 36 pounds. In addition to the magnetic polarity keying, which discourages misalignment during donning, the recessed pockets of the rotational driving member may be arranged in a non-uniform pattern of differing surfaces that matches an opposing pattern of the surfaces of the raised features of the driven element. The patterning of the mechanical interface provides an additional mechanical keying feature that further precludes an improper misaligned engagement between the two components of the coupling system. Thus, the coupling system may be both mechanically and magnetically keyed to ensure proper alignment when donning.

In another exemplary embodiment, one side of the coupling system may be loaded with ferrous discs (e.g. steel) rather than magnetic elements. This could enable connecting in a variety of orientations if desired, in contrast to the keying of the previous embodiment. Such configuration also may reduce the mating impact of the coupling components as they come together, as the attractive force of magnet to steel decays more quickly with distance than that of magnet to magnet. Connecting in a variety of orientations also could be achieved by maintaining a uniform polarity convention for all magnets, in contrast to the magnetic keying of the previous embodiment. In other words, in each of the rotational driving member and the driven component the polarity may be the same for all magnetic elements, i.e., north pole facing out for all magnetic elements in the rotational driving component and south pole facing out for all magnetic elements in the driven component, or vice versa. In yet another exemplary embodiment, the magnetic elements may be used to assist with alignment and engagement during assembly, but an additional locking feature may be present to positively engage the coupling of the two components, and/or handle the torque loading and/or separation forces during use.

In accordance with such features, a joint actuator assembly includes a motor, a rotating driving member driven by the motor for driving a driven component, and a transmission assembly located between the motor and the rotating driving member that provides a speed reduction from the motor to the rotating driving member. The rotating driving member comprises a magnetic coupling including a plurality of magnetic elements that are configured to magnetically couple with an opposing magnetic coupling of the driven component. The actuator and driven component may be combined into a mobility device including a magnetic coupling system having a first magnetic coupling on the actuator assembly that magnetically couples to a second magnetic coupling on the driven component. The magnetic coupling system includes plurality of magnetic elements located as part of one or both of the first and second magnetic couplings. The first and second magnetic couplings have opposing mating surfaces that joint together when the magnetic coupling system is in a coupled position.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
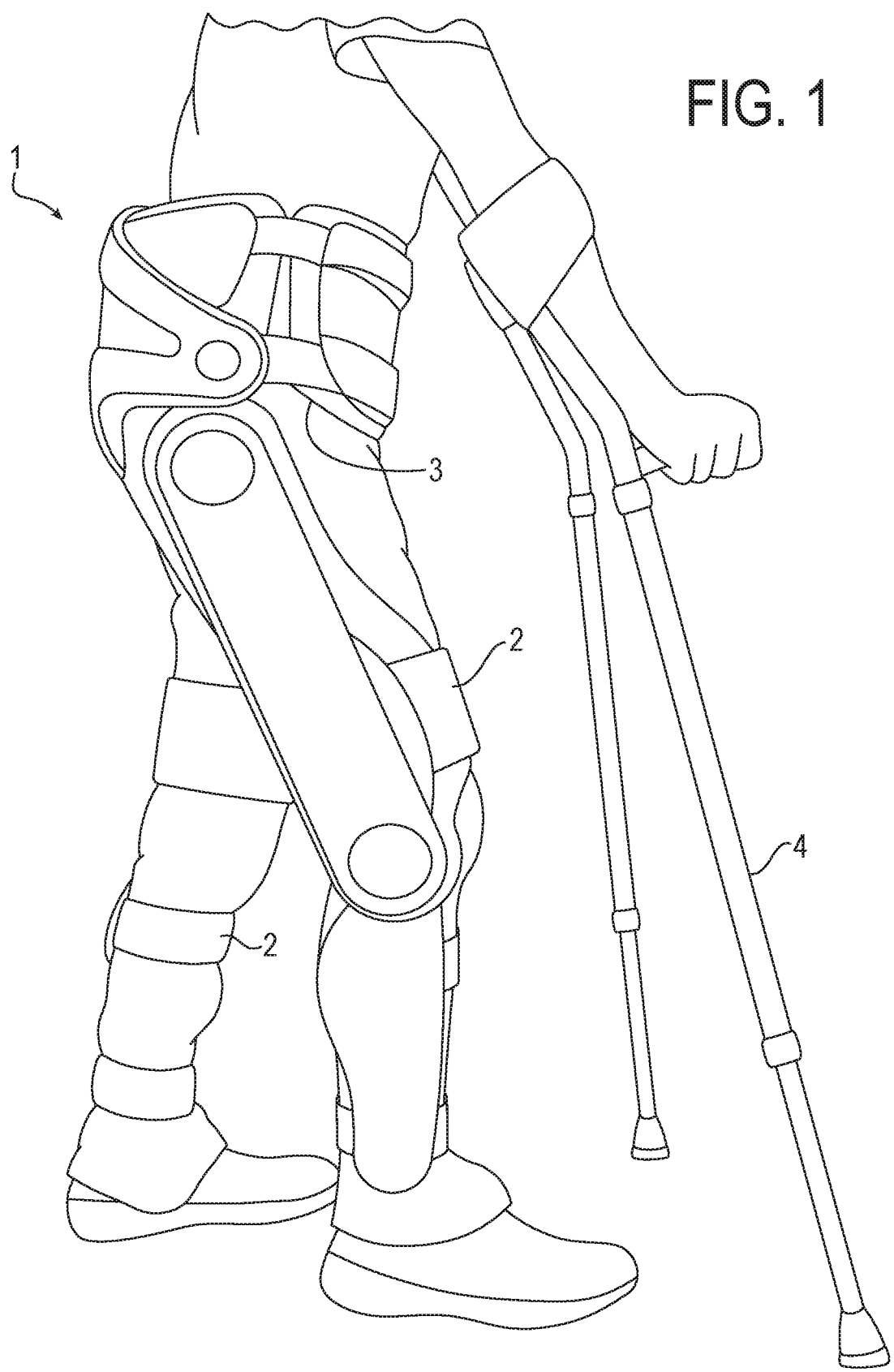
FIG. 1 is a drawing depicting an exemplary exoskeleton device as being worn by a user.

Embodiments of the present invention will now be described with reference to the drawings, wherein like reference numerals are used to refer to like elements throughout. It will be understood that the figures are not necessarily to scale.

For context, FIGS. 1-11 depict various views of an exemplary exoskeleton device that may be used in connection with the magnetic coupling system of the present invention. A somewhat generalized description of such exoskeleton device is provided here for illustration purposes. A more detailed description of such device may be found in Applicant's International Patent Appl. No. PCT/US2015/023624 filed on Mar. 3, 2015, which is incorporated here in its entirety by reference. It will be appreciated, however, that the described exoskeleton device presents an example usage, and that the features of the magnetic coupling system of the present invention are not limited to any particular configuration of an exoskeleton device. Variations may be made to the exoskeleton device, while the features of the present invention remain applicable. In addition, the principles of this invention may be applied generally to any suitable mobility device. Such mobility devices include, for example, orthotic devices which aid in mobility for persons without use or limited use of a certain body portion, and prosthetic devices, which essentially provide an electromechanical replacement of a body part that is not present such as may be used by an amputee or a person congenitally missing a body portion. The mobility devices may be configured as or include lower and/or upper joint components either individually or in combination as a unitary component.

As show in FIG. 1, an exoskeleton device 1, which also may be referred to in the art as a "wearable robotic device", can be worn by a user. To attach the device to the user, the device 1 can include attachment devices 2 for attachment of the device to the user via belts, loops, straps, or the like. Furthermore, for comfort of the user, the device 1 can include padding 3 disposed along any surface likely to come into contact with the user. The device 1 can be used with a stability aid 4, such as crutches, a walker, or the like.

Figure 2:
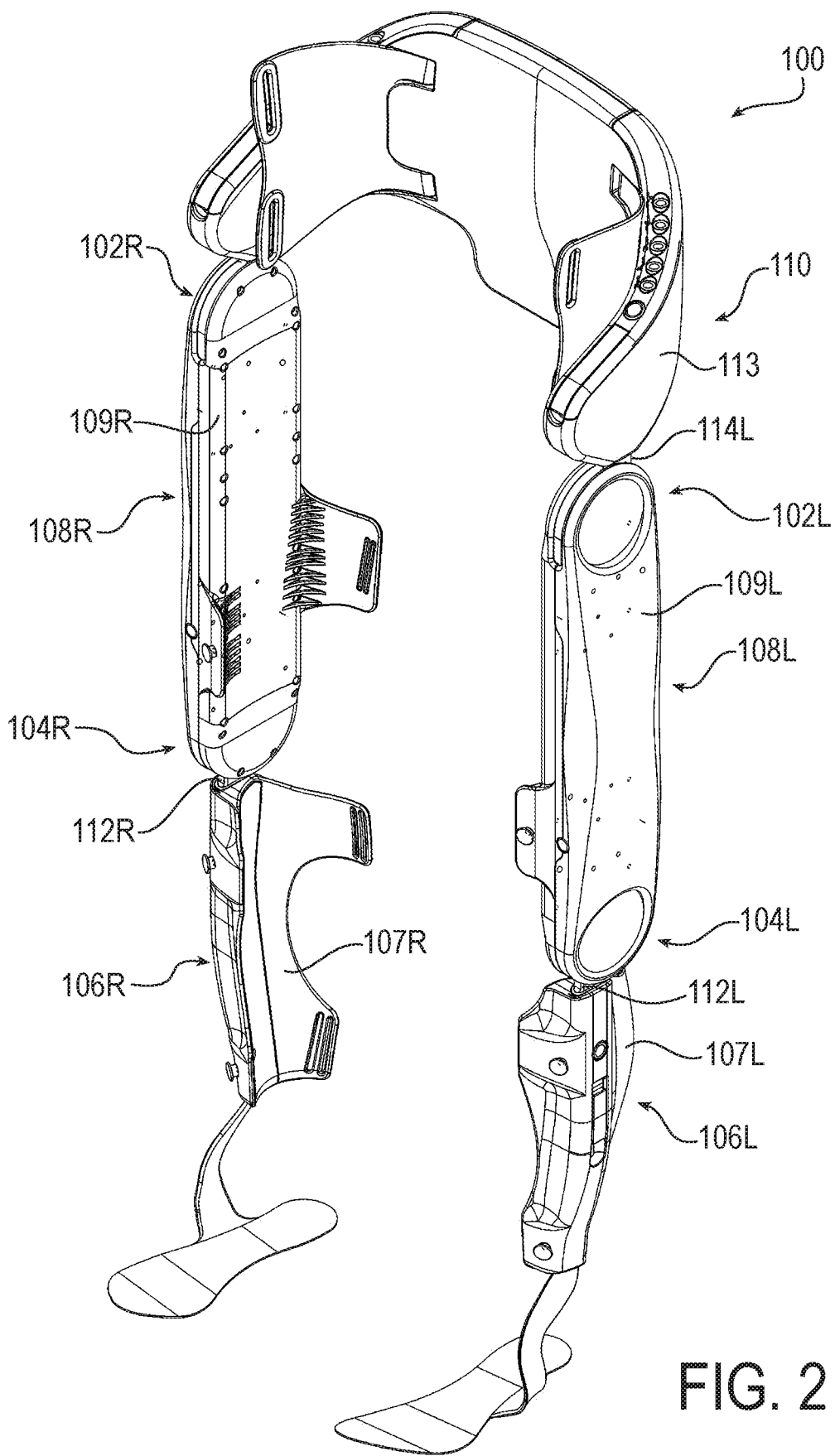
FIG. 2 is a drawing depicting a perspective view of an exemplary exoskeleton device in a standing position.
Figure 3:
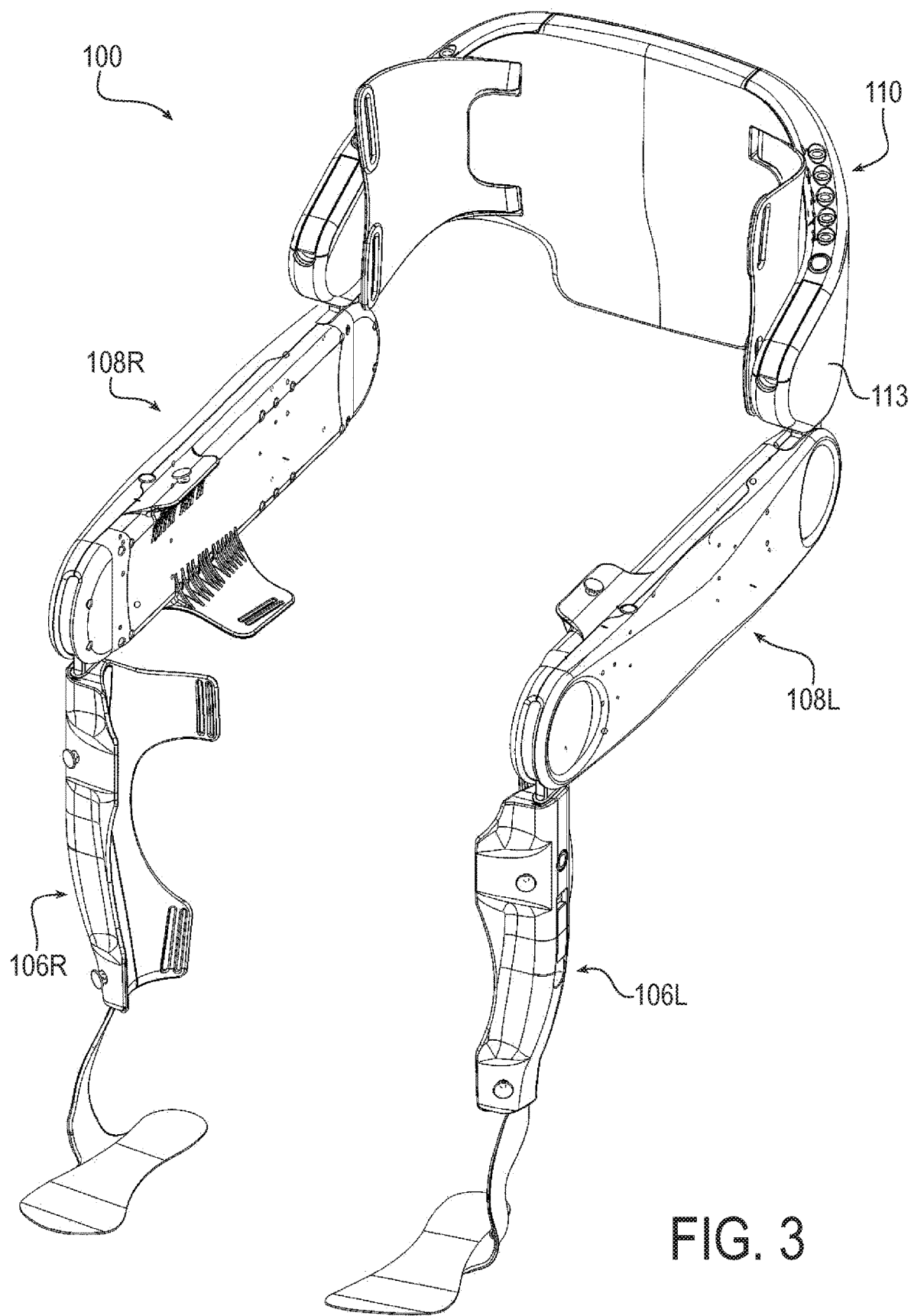
FIG. 3 is a drawing depicting a perspective view of the exemplary exoskeleton device in a seated position.
Figure 4:
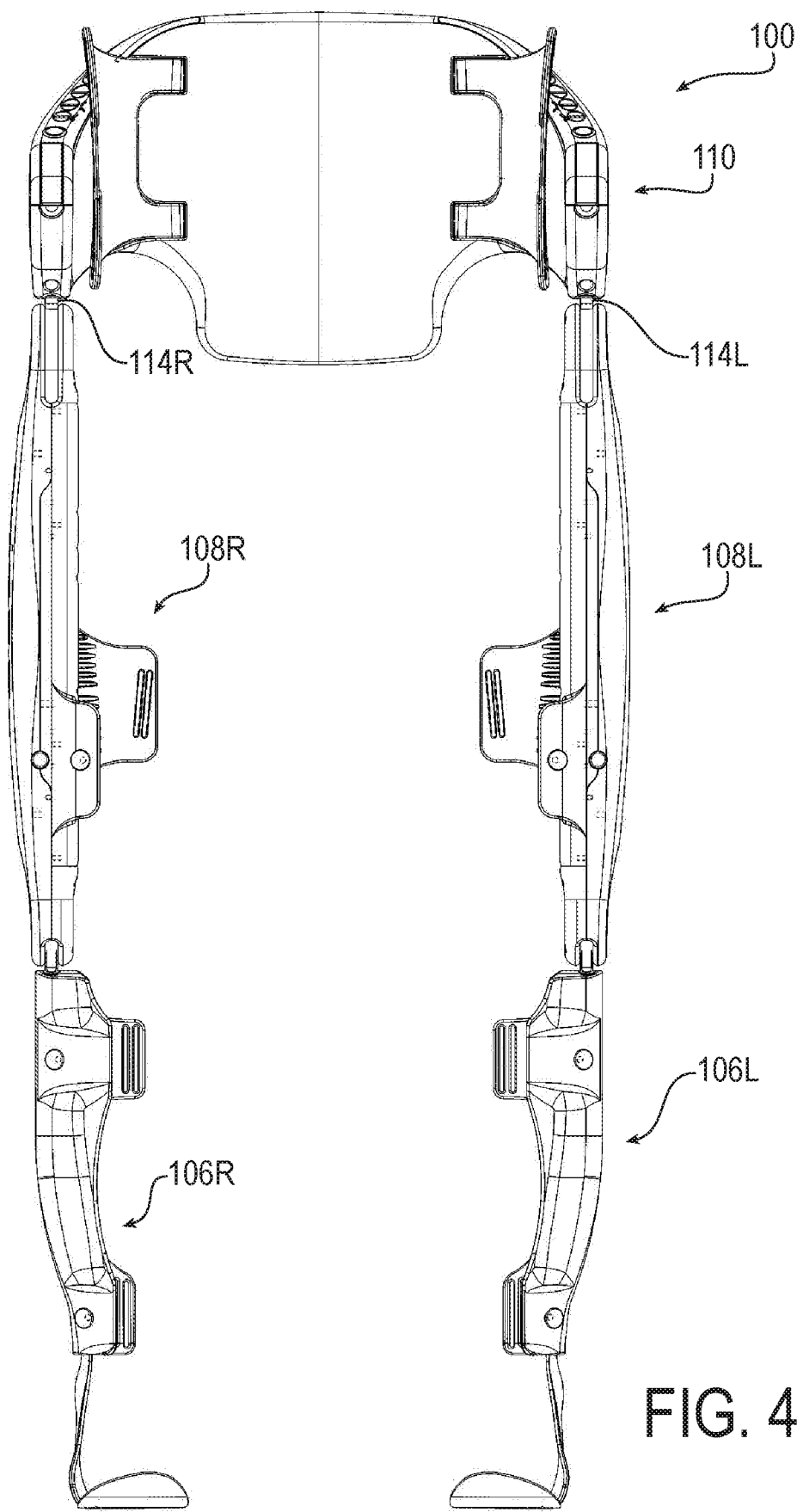
FIG. 4 is a drawing depicting a front view of the exemplary exoskeleton device in a standing position.
Figure 5:
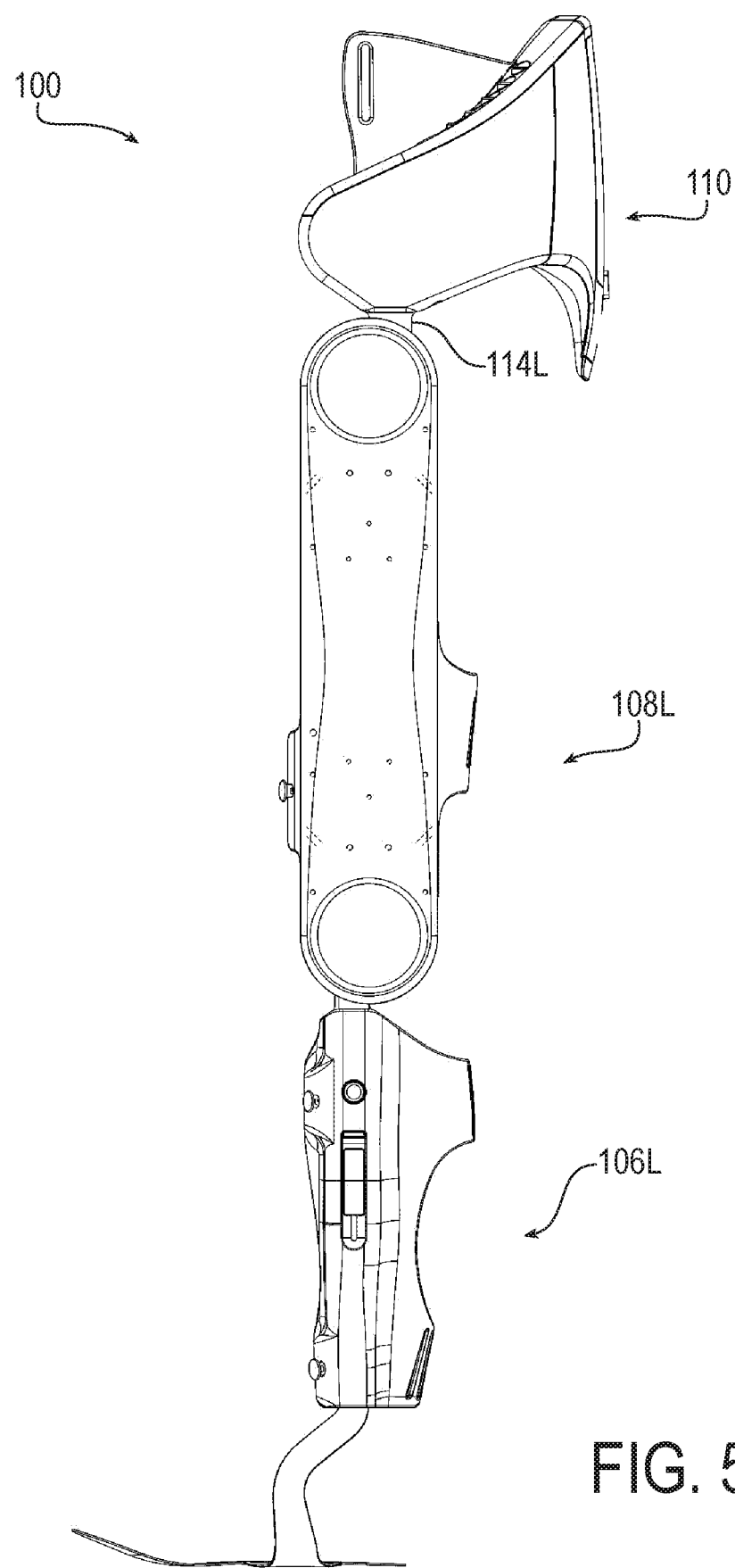
FIG. 5 is a drawing depicting a side view of the exemplary exoskeleton device in a standing position.
Figure 6:
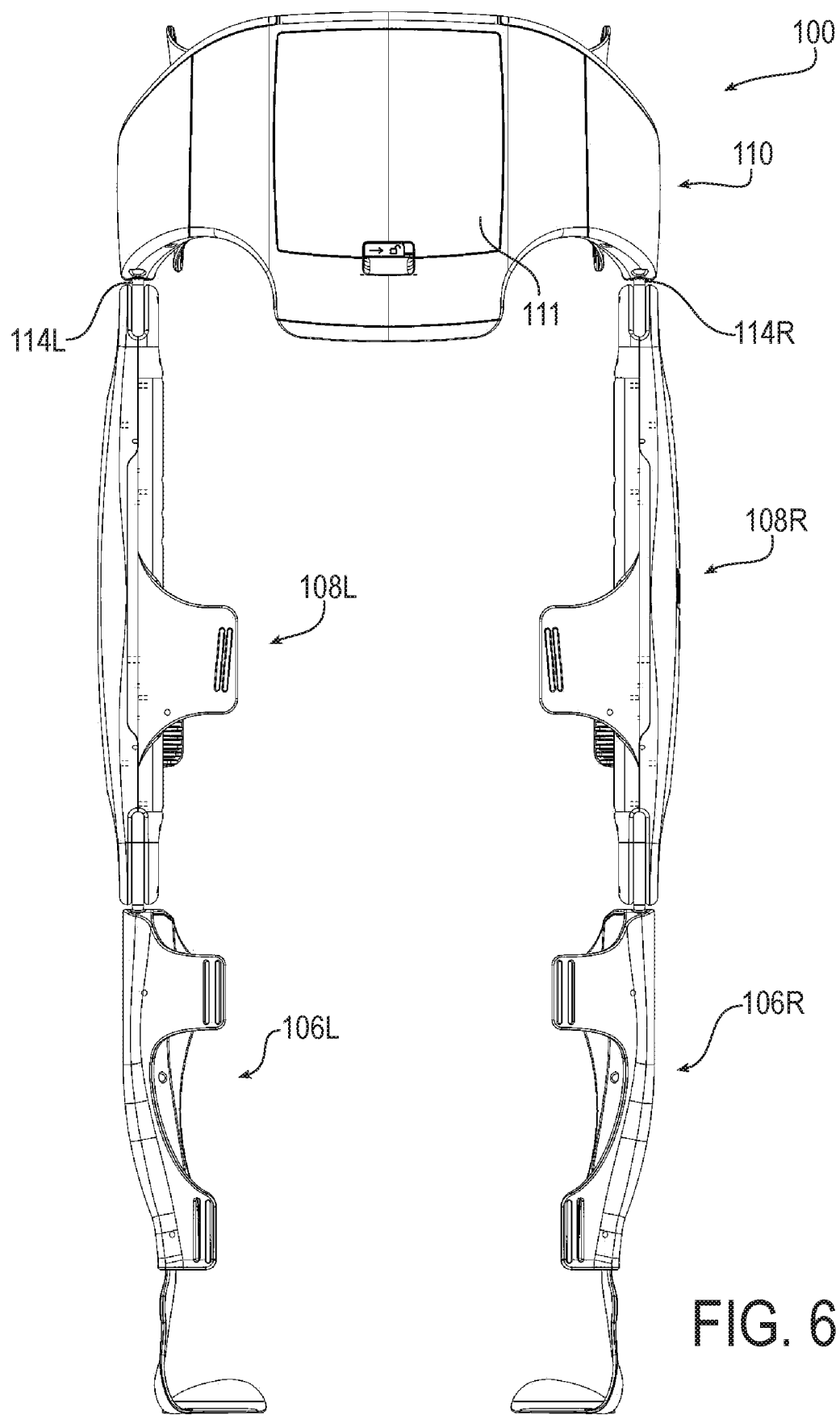
FIG. 6 is a drawing depicting a back view of the exemplary exoskeleton device in a standing position.
Figure 7:
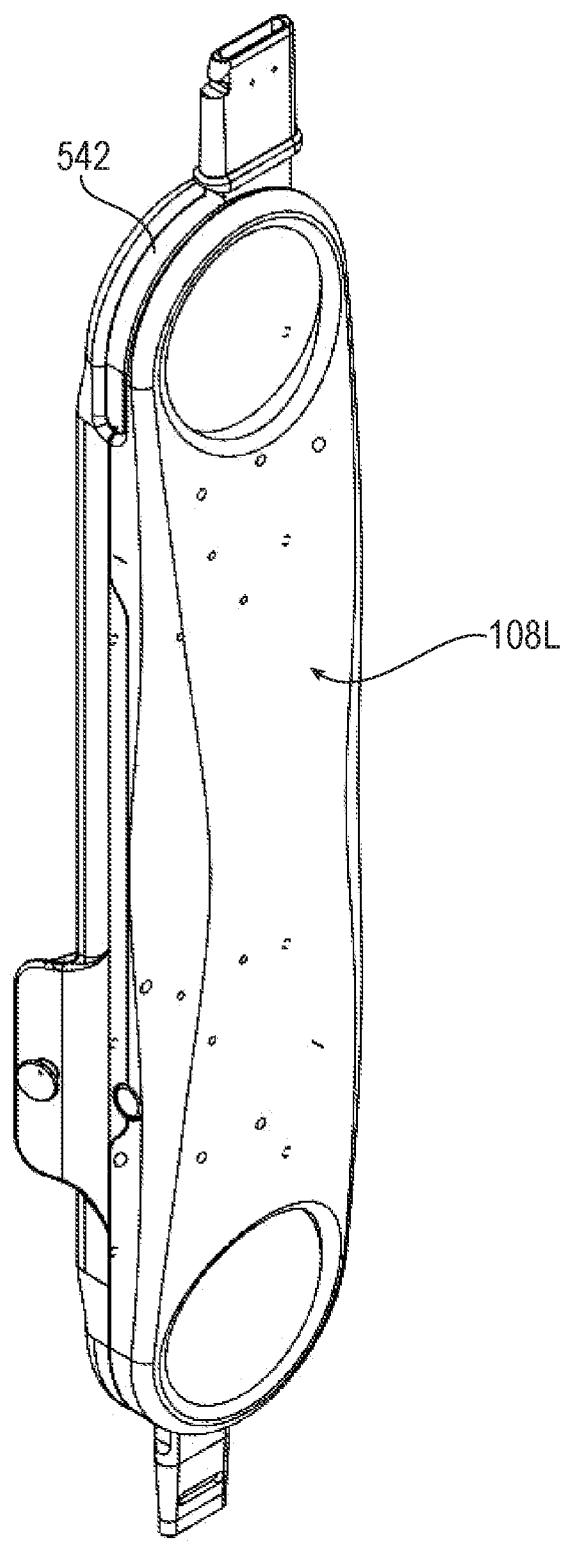
FIG. 7 is a drawing depicting a perspective view of an exemplary thigh assembly having two exemplary actuator cassettes installed therein.
Figure 8:
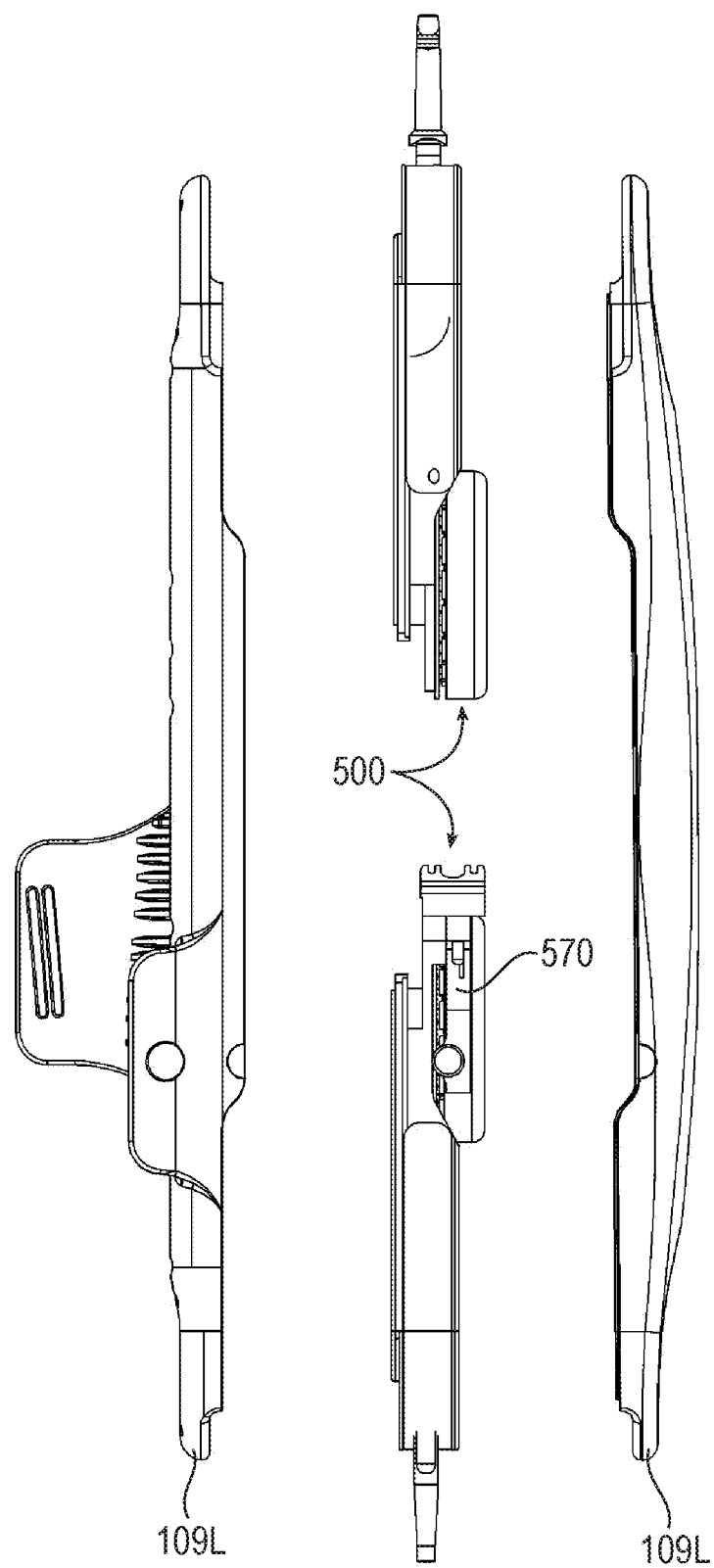
FIG. 8 is a drawing depicting a front exploded view of the exemplary thigh assembly having two exemplary actuator cassettes installed therein.
Figure 9:
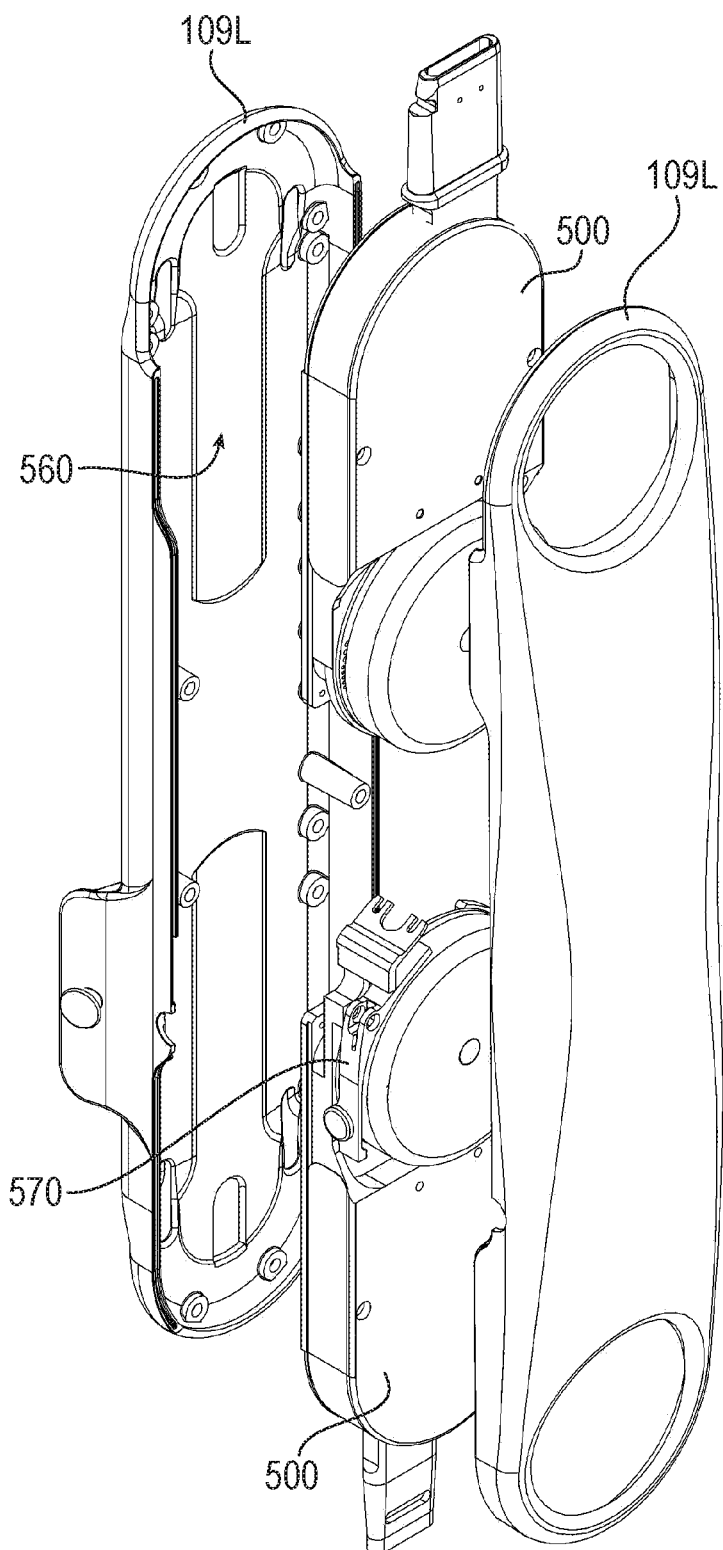
FIG. 9 is a drawing depicting a perspective exploded view of the exemplary thigh assembly having two exemplary actuator cassettes installed therein.
Figure 10:
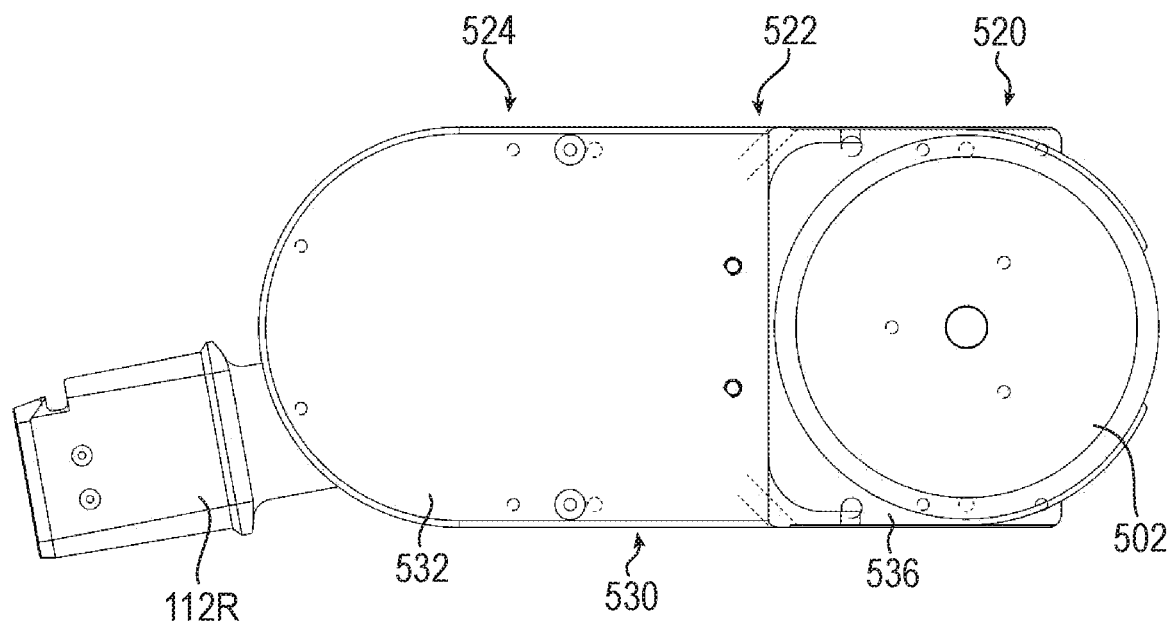
FIG. 10 is a drawing depicting a top view of an exemplary actuator cassette.
Figure 11:
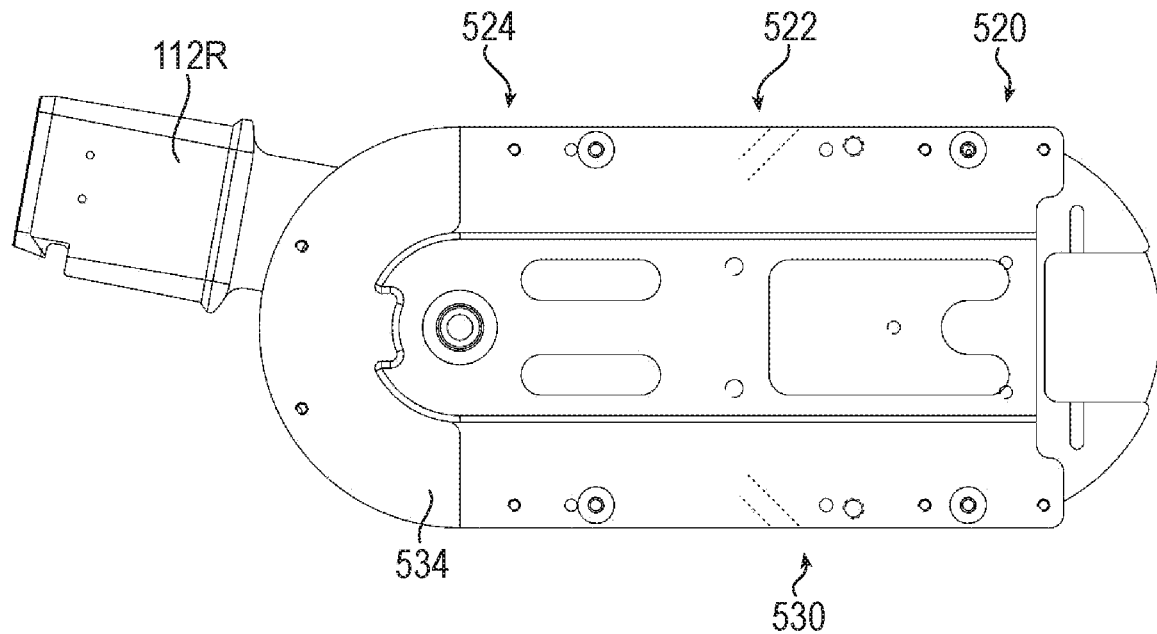
FIG. 11 is a drawing depicting a bottom view of an exemplary actuator cassette.

An exemplary legged mobility exoskeleton device is illustrated as a powered lower limb orthosis 100 in FIGS. 2-6. Specifically, the orthosis 100 shown in FIGS. 2-6 may incorporate four drive components configured as electromotive devices (for example, electric motors), which impose sagittal plane torques at each knee and hip joint components including (right and left) hip joint components 102R, 102L and knee joint components 104R, 104L. FIG. 2 shows the orthosis 100 in a standing position while FIG. 3 shows the orthosis 100 in a seated position.

As seen in the figures, the orthosis contains five assemblies or modules, although one or more of these modules may be omitted and further modules may be added (for example, arm modules), which are: two lower (right and left) leg assemblies (modules) 106R and 106L, two (left and right) thigh assemblies 108R and 108L, and one hip assembly 110. Each thigh assembly 108R and 108L includes a respective thigh assembly housing 109R and 109L, and link, connector, or coupler 112R and 112L extending from each of the knee joints 104R and 104L and configured for moving in accordance with the operation of the knee joints 104R and 104L to provide sagittal plane torque at the knee joints 104R and 104L.

The connectors 112R and 112L further may be configured for releasably mechanically coupling each of thigh assembly 108R and 108L to respective ones of the lower leg assemblies 106R and 106L. Furthermore, each thigh assembly 108R and 108L also includes a link, connector, or coupler 114R and 114L, respectively, extending from each of the hip joint components 102R and 102L and moving in accordance with the operation of the hip joint components 102R and 102L to provide sagittal plane torque at the knee joint components 104R and 104L. The connectors 114R and 114L further may be configured for releasably mechanically coupling each of thigh assemblies 108R and 108L to the hip assembly 110.

In some embodiments, the various components of device 100 can be dimensioned for the user. However, in other embodiments the components can be configured to accommodate a variety of users. For example, in some embodiments one or more extension elements can be disposed between the lower leg assemblies 106R and 106L and the thigh assemblies 108R and 108L to accommodate users with longer limbs. In other configurations, the lengths of the two lower leg assemblies 106R and 106L, two thigh assemblies 108R and 108L, and one hip assembly 110 can be adjustable. That is, thigh assembly housings 109R, 109L, the lower leg assembly housings 107R and 107L for the lower leg assemblies 106R, 106L, respectively, and the hip assembly housing 113 for the hip assembly 110 can be configured to allow the user or medical professional to adjust the length of these components in the field. For example, these components can include slidable or movable sections that can be held in one or more positions using screws, clips, or any other types of fasteners. In view of the foregoing, the two lower leg assemblies 106R and 106L, two thigh assemblies 108R and 108L, and one hip assembly 110 can form a modular system allowing for one or more of the components of the orthosis 100 to be selectively replaced and for allowing an orthosis to be created for a user without requiring customized components. Such modularity can also greatly facilitate the procedure for donning and doffing the device.

In orthosis 100, each thigh assembly housing 109R, 109L may include substantially all the drive components for operating and driving corresponding ones of the knee joint components 104R, 104L and the hip joint components 102R, 102L. In particular, each of thigh assembly housings 109R, 109L may include drive components configured as two motive devices (e.g., electric motors) which are used to drive the hip and knee joint component articulations. However, the various embodiments are not limited in this regard, and some drive components can be located in the hip assembly 110 and/or the lower leg assemblies 106R, 106L.

A battery 111 for providing power to the orthosis can be located within hip assembly housing 113 and connectors 114R and 114L can also provide means for connecting the battery 111 to any drive components within either of thigh assemblies 108R and 108L. For example, the connectors 114R and 114L can include wires, contacts, or any other types of electrical elements for electrically connecting battery 111 to electrically powered components in thigh assemblies 108R and 108L. In the various embodiments, the placement of battery 111 is not limited to being within hip assembly housing 113. Rather, the battery can be one or more batteries located within any of the assemblies of orthosis 100.

The referenced drive components may incorporate suitable sensors and related internal electronic controller or control devices for use in control of the exoskeleton device. Such internal control devices may perform using the sensory information the detection of postural cues, by which the internal control device will automatically cause the exoskeleton device to enter generalized modes of operation, such as sitting, standing, walking, variable assist operation, and transitions between these generalized modes or states (e.g., Sit to Stand, Stand to Walk, Walk to Stand, Stand to Sit, etc.) and step transition (e.g., Right Step, Left Step).

In the various embodiments, to maintain a low weight for orthosis and a reduced profile for the various components, the drive components may include a substantially planar drive system that is used to drive the hip and knee articulations of the joint components. For example, each motor can respectively drive an associated joint component through operation of an actuator containing a multi-stage speed-reduction transmission using an arrangement of reduction stages oriented substantially parallel to the plane of sagittal motion. Referring to FIGS. 7-11, consolidating the moveable parts into self-contained units, referred to herein as "cassettes," allow for ease of maintenance and replacement because cassettes are swappable, making them easier to service or requiring less of a variety in spare components. As used herein, "self-contained" means that the cassette includes everything necessary to operate in a fully functional manner if supplied with power, including receiving or generating as warranted any related control signals to the joint components. Thus, for example, if power is supplied to electrical contacts of the cassette, the cassette would actuate.

In the illustrated embodiments of the drive components, an exemplary actuator assembly includes a motor that is integrated onto a common baseplate along with the speed reduction stages of the transmission. The actuator assembly provides smooth and efficient transfer of motion from the motor to the joint angle. Integrating the motor into the cassette allows for a thinner overall package configuration and provides consistent alignment among parts. Moreover, integrating the motor into a cassette also creates a larger surface area to transfer and emit heat generated by the motor. In the instance of a mobility assistance device, these cassettes may pertain to a specific joint or set of joints on the device. Each may have a unique actuation unit or share an actuation unit. The cassettes may also house the electronic control device, and further may contain sensor elements such as the accelerometers, gyroscopes, inertial measurement, and other sensors to detect and observe the upper leg orientation or angle and angular velocity. The self-contained cassette units can be preassembled to aid in manufacturing the broader device. This allows for quick servicing of the device since individual cassettes can be swapped out and serviced.

Therefore, referring to FIGS. 7-11, a removable, self-contained, ovular actuator cassette 500 may be receivable in a receptacle of a wearable robotic device, such as for example in a left thigh component 108L. It will be appreciated that a comparable cassette design may be incorporated into any of the joint components of the device. The cassette 500 may include a first circular portion 520 housing a motive device (e.g., an electric motor) 502. A second circular portion 522 may be longitudinally offset and longitudinally overlapping the first circular portion and may house a transmission system, described in detail below, driven by the motive device 502. A third circular portion 524 may be longitudinally offset from the first and second circular portions and longitudinally overlapping the second circular portion and may house a second portion of the transmission. These three overlapping circular portions make an ovular shape, which may include the referenced sensors and electronic control devices. Therefore, an ovular housing 530 may support the motive device 502 and the multi-stage transmission system described below. Long sides of the ovular housing are straight and parallel with each other and tangentially terminate as curved end surfaces of the ovular housing.

Figure 12:
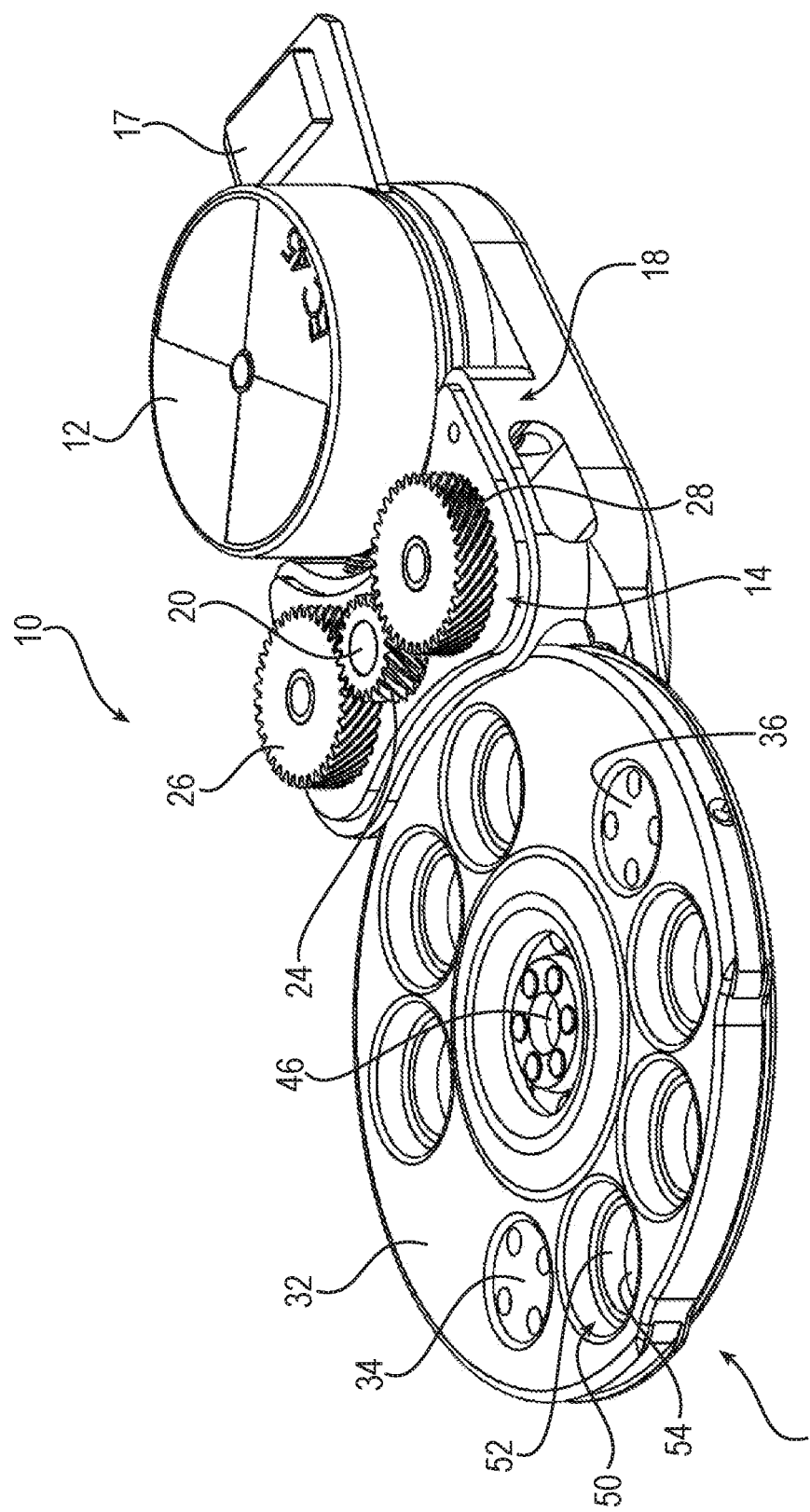
FIG. 12 is a drawing depicting an isometric view of an exemplary joint actuator assembly in accordance with embodiments of the present invention.
Figure 13:
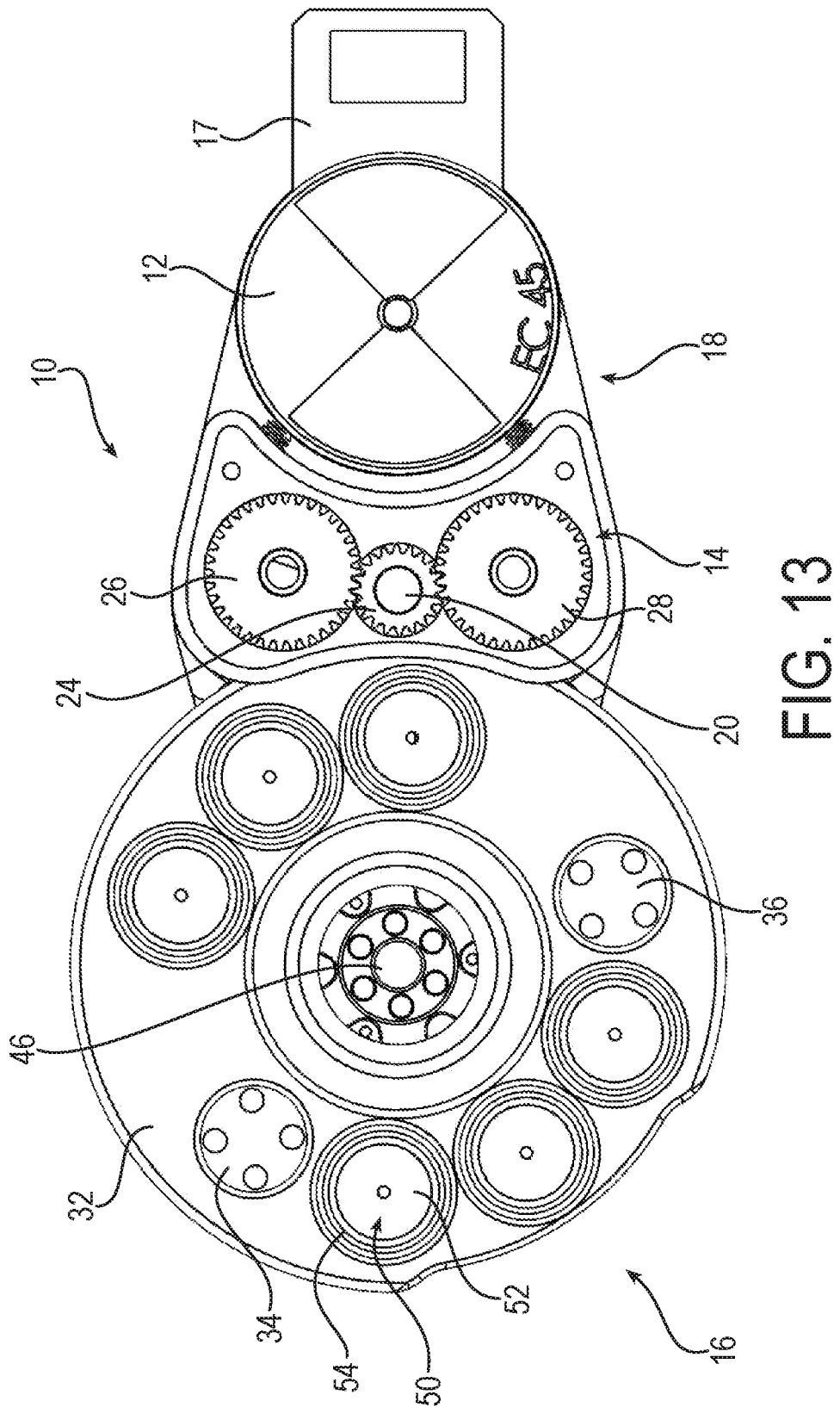
FIG. 13 is a drawing depicting a top view of the exemplary actuator assembly of FIG. 12.

FIGS. 12-13 depict two different views of an exemplary actuator assembly 10 in accordance with embodiments of the present invention. The actuator assembly 10 may be incorporated into a cassette configuration as described above. One actuator assembly 10 in a cassette may be employed for a knee joint, and another actuator assembly in a cassette may be employed for a hip joint. Such a configuration may be employed on both left and rights sides for a legged mobility exoskeleton device.

In general, in exemplary embodiments a joint actuator assembly may include a motor that drives a joint connector for driving a joint of a mobility device; a first stage of speed reduction connected to an output shaft of the motor for providing a speed reduction of the motor output; a second stage of speed reduction linked to an output of the first stage of speed reduction for providing a speed reduction relative to the output of the first stage; and a third stage of speed reduction linked to an output of the second stage of speed reduction for providing a speed reduction relative to the output of the second stage. The first, second, and third stages operate as a three-stage transmission to provide the output that drives the joint connector.

Referring to the particular figures, FIG. 12 is a drawing depicting an isometric view of the exemplary joint actuator assembly 10 in accordance with embodiments of the present invention. FIG. 13 is a drawing depicting a top view of the exemplary actuator assembly 10 of FIG. 12. The actuator assembly 10 may be configured as a high torque-to-weight ratio actuator having a three-stage transmission with a cable reel, roller chain, or belt final transmission stage. Alternatively, any stage may be configured using gears for speed reduction. With such a configuration, the actuator assembly 10 operates as an actuator for driving a joint component of the mobility device via a three-stage speed reduction transmission to provide adequate output torque to drive the joint components of the legged mobility device.

Referring to the figures, the actuator assembly 10 may include a motor 12, a helical gear stage 14, and a cable reel assembly stage 16. Together, such components comprise the three-stage transmission that generates the output torque to drive the joint components of the legged mobility device. The motor 12 may be a brushless DC electric motor, and may have a flat profile that is sized and shaped for incorporation into an actuator cassette referenced above. The actuator assembly 10 may be powered via a power connector 17 that is electrically connected to an external power source. In exemplary embodiments in which the actuator assembly 10 is contained in a cassette in a thigh assembly, one actuator assembly 10 may be connected to a hip assembly to provide movement at the upper leg or hip joint. In addition, also located in the cassette an oppositely oriented actuator assembly 10 may be connected to a lower leg assembly to provide movement at the knee joint.

Additional details of the three-stage transmission system of the actuator assembly 10 are described in Applicant's U.S. provisional application filed on the same day as the current application, and entitled "LEGGED MOBILITY EXOSKELETON DEVICE WITH ENHANCED ACTUATOR MECHANISM." Such application is incorporated here by reference. The three-stage transmission system is considered a non-limiting example for illustration. Other configurations of speed reduction transmission systems may be employed, which may use the magnetic coupling system of the present invention, including a multi-stage transmission assembly having a number of stages different from three stages, such as for example a two-stage speed reduction transmission assembly.

In the example of FIGS. 12 and 13, generally a first transmission stage 18 may include the motor 12 referenced above, which through a drive mechanism drives an output shaft 20. The driving of the first stage output shaft 20 interconnects the first stage 18 of the actuator assembly 10 to the helical gear stage 14, which operates as a second stage of speed reduction. More particularly, the first stage output shaft 20 may be mechanically connected to a central gear 24. The central gear 24 may mesh with first and second outer gears 26 and 28, each located on opposite sides of the central gear 24 as shown in FIGS. 12-13. In this manner, the central gear 24 may transmit power to the first and second outer gears 26 and 28. In addition, the two outer helical gears are larger than the central helical gear to provide the second stage of speed reduction of the output of the first stage of speed reduction. These large helical gears 26 and 28 may be linked to a third final stage of speed reduction that is configured as the cable reel assembly 16, such that the output of the second stage of speed reduction transmits power to the third stage of speed reduction. Generally, the cable reel assembly 16 may include an output reel 32 and at least one cable element (not shown) that interconnects the output of the second stage of speed reduction and the output reel. The output of the second stage of speed reduction thus transmits power to the output reel 32. Multiple cable elements may be provided that spool around first and second cable reels 34 and 36, such that the cable reels operate oppositely to draw in or pay out cable to drive rotation of the output reel 32. The third speed reduction is achieved due to the larger size of the output reel 32 relative to the cable reel path around the outer helical gear 26 and 28, as shown in FIGS. 12 and 13. As referenced above, details of the three-stage transmission system of the actuator assembly 10, which is a non-limiting example, are describe in Applicant's other provisional application filed on the same day as the current application, and which is incorporated here by reference.

Referring to FIGS. 12 and 13, the output reel 32 further may include a magnetic/electrical quick connect assembly 46. The quick connect assembly is described in detail in another separate provisional patent application being filed contemporaneously herewith, entitled "LEGGED MOBILITY EXOSKELETON DEVICE WITH ENHANCED ACTUATOR MECHANISM EMPLOYING MAGNETIC/ELECTRICAL CONNECTOR," which also is incorporated here by reference.

Aspects of the present invention pertain to a magnetic coupling system that couples the actuator assembly 10 to a driven component. Generally, in exemplary embodiments a joint actuator assembly includes a motor, a rotating driving member driven by the motor for driving a driven component, and a transmission assembly as referenced above located between the motor and the rotating driving member that provides a speed reduction from the motor to the rotating driving member. The rotating driving member includes a magnetic coupling including a plurality of magnetic elements that are configured to magnetically couple with an opposing magnetic coupling of the driven component. The magnetic coupling may include a plurality of recessed pockets, and at least one of the recessed pockets includes a respective one of the plurality of magnetic elements located at a bottom of the recessed pocket.

Referring again to FIGS. 12 and 13, the output reel 32 may include a plurality of recessed pockets 50 that can provide for magnetic coupling of the actuator assembly 10 to a driven component that is driven by rotation of the output reel 32. In the example of FIGS. 12 and 13, the output reel 32 includes six such recessed pockets 50 spaced equidistantly around the output reel as an exemplary embodiment, although any suitable number of recessed pockets may be employed. In this embodiment, each recessed pocket 50 includes a first magnetic element 52 located at the bottom of the recess pocket (i.e., there are six magnetic elements in this embodiment) that is used for magnetic coupling, although as further detailed below magnetic elements may be included on the driven component additionally or alternatively to the magnetic elements of the actuator assembly. In this regard, all of the recessed pockets, or less than all of the recessed pockets, may include a magnetic element 52. In exemplary embodiments, the magnetic elements 52 each may be configured as a cylindrical neodymium disc magnet installed in the bottom of the recessed pocket 50. Each recessed pocket further may include a first mating surface 54 to aid in magnetic coupling to a cooperating mating surface of the driven component.

Figure 14:
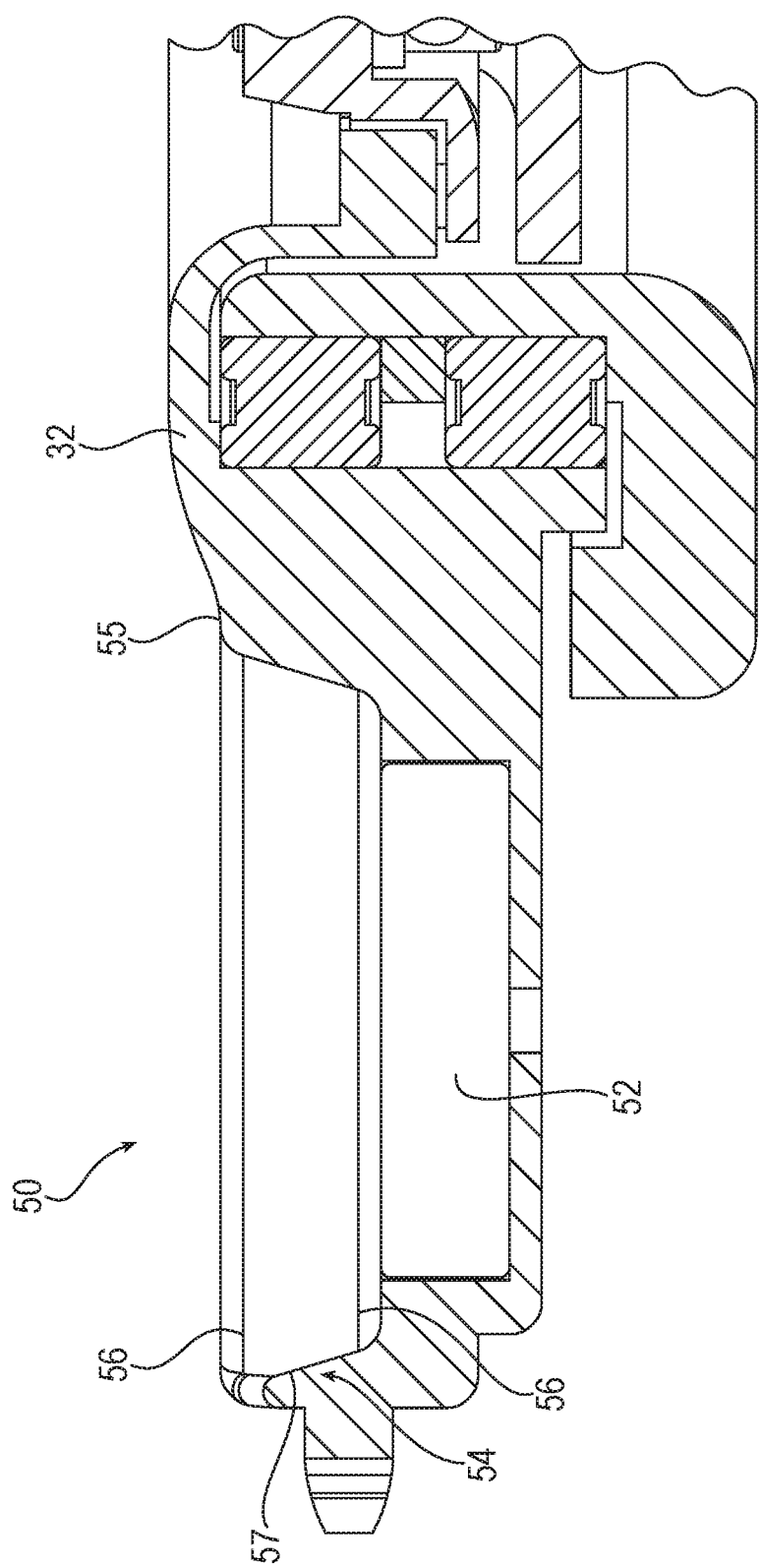
FIG. 14 is a drawing depicting a close-up side cross-sectional view of an exemplary recessed pocket included in the actuator assembly of FIGS. 12 and 13.

FIG. 14 is a drawing depicting a close-up side cross-sectional view of an exemplary recessed pocket 50 included in the actuator assembly of FIGS. 12 and 13. FIG. 14 provides a more detailed view showing features of the first mating surface 54. The mating surface 54 generally extends from an outer surface 55 of the rotating driving member (output reel) 32 toward the bottom of the recessed pocket where the magnetic element 52 may be located. In exemplary embodiments, the first mating surface 54 may be a tapered mating surface. The tapered mating surface further may be a stepped surface including a plurality of ridges 56 that are connected by a tapered surface 57. The ridges 56 provide support against sliding movement of a driven component relative to the output reel 32 of the actuator assembly. In exemplary embodiments, the tapered shape may be tapered at an angle of approximately 15 degrees relative to a normal extending from the bottom of the recess pocket where the magnetic element 52 is located.

Rotation of the output reel 32 drives a driven component, such as for example an upper or lower joint component of a mobility device. Generally, the driven component may be a contoured plastic orthotic component that contours and attaches to the lower leg of a human wearer, or to a hip component that is worn about the user's torso. The coupling of the actuator assembly with the driven component thus forms a joint component at which rotational movement may be achieved to permit user movements while wearing the mobility device. The driven component may include a coupling portion having raised mating features or protrusions that essentially match the recessed pockets of the output reel of the actuator assembly. These raised mating features of the driven component also may include magnetic elements that are comparable to the magnetic elements in the output reel but oriented with opposite polarity, and thus also may be embedded neodymium disc magnets.

Figure 15:
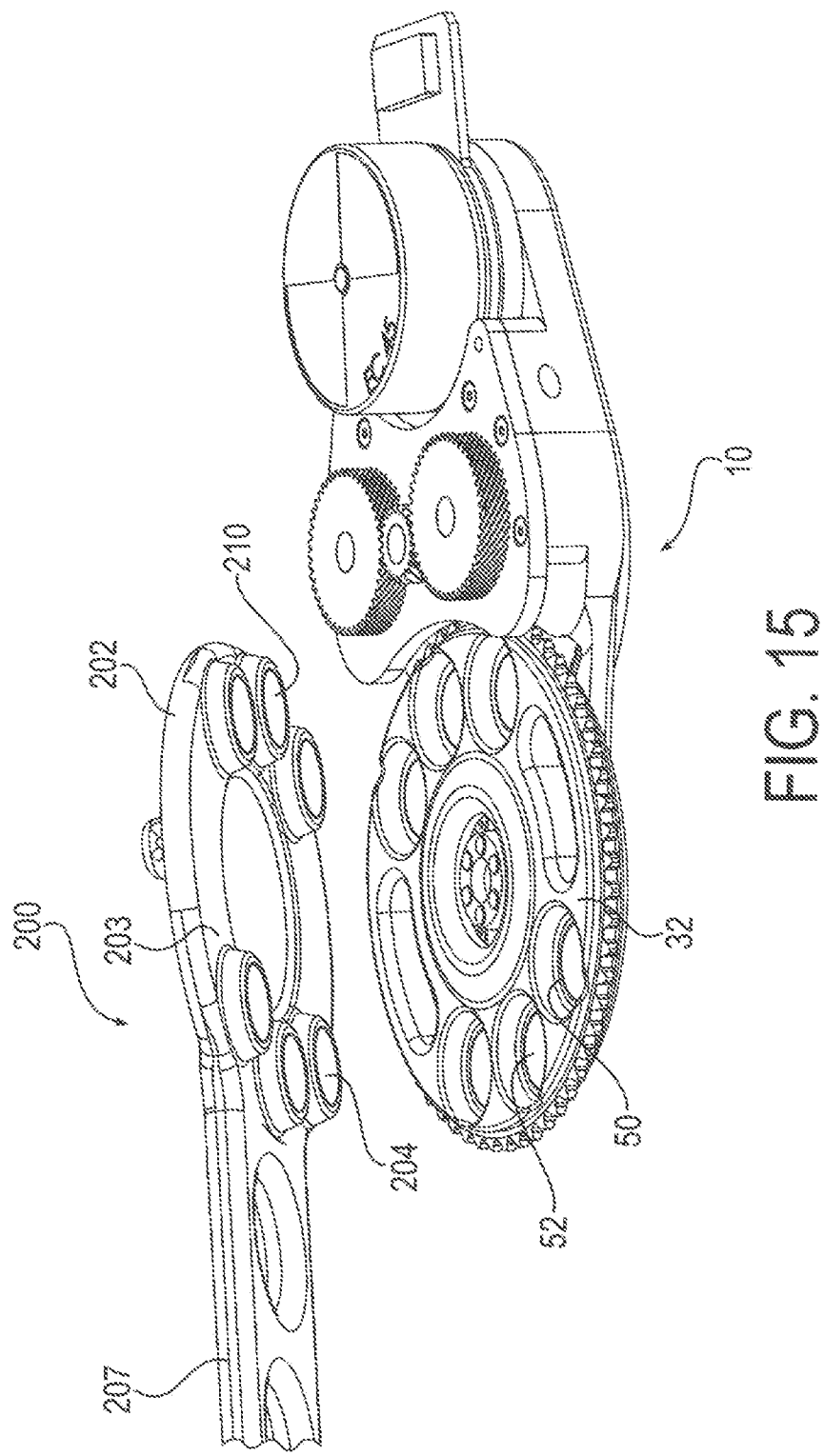
FIG. 15 is a drawing depicting a first isometric view of the exemplary joint actuator assembly in combination with an exemplary driven component, in accordance with embodiments of the present invention.
Figure 16:
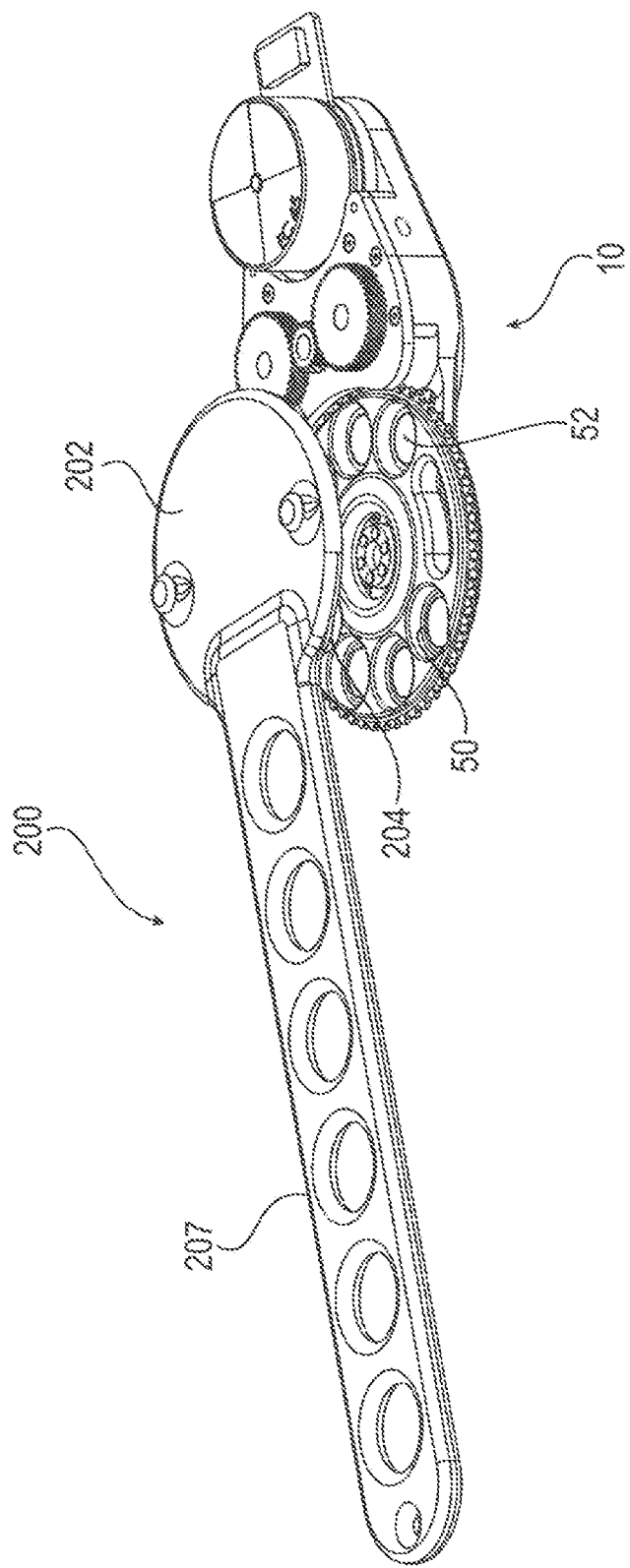
FIG. 16 is a drawing depicting a second isometric view of the combined exemplary joint actuator assembly and driven component of FIG. 15.
Figure 17:
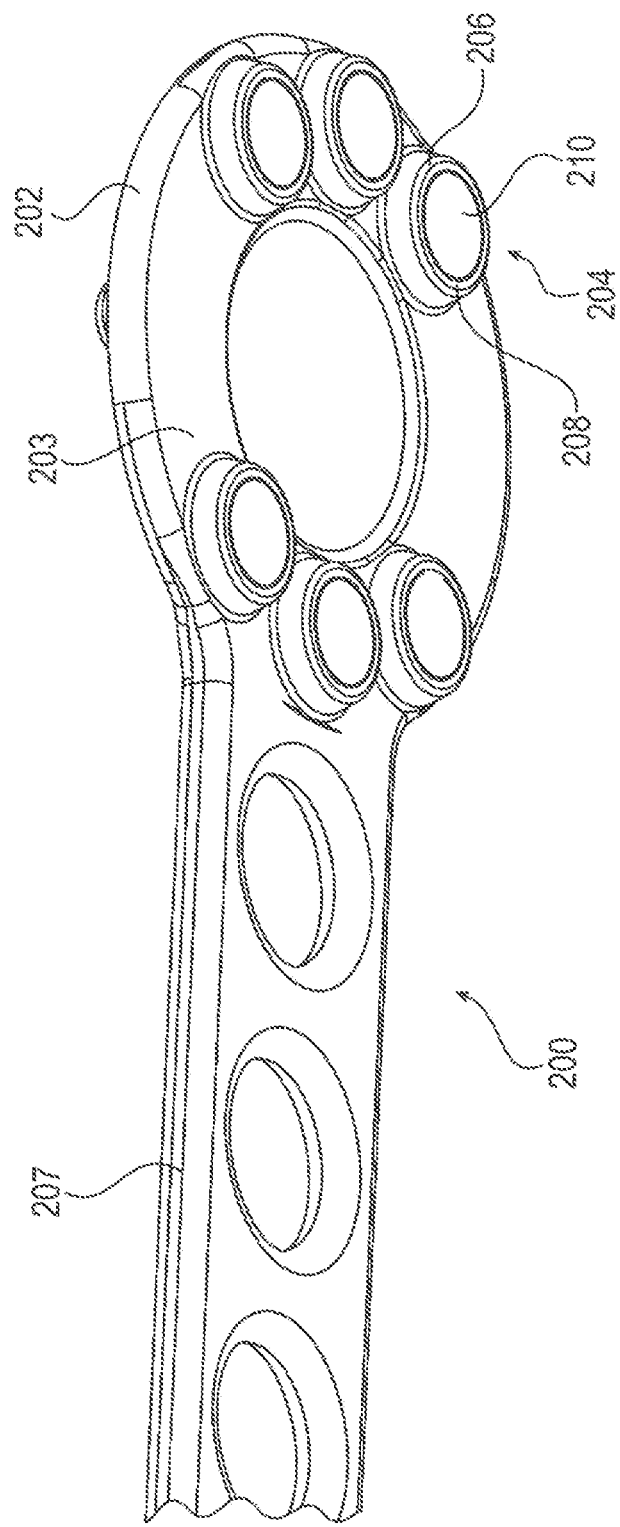
FIG. 17 is a drawing depicting an isometric view of the exemplary driven component of FIGS. 15 and 16 in isolation.

In accordance with such features, FIG. 15 is a drawing depicting a first isometric view of the exemplary joint actuator assembly 10 in combination with an exemplary driven component 200, in accordance with embodiments of the present invention. FIG. 16 is a drawing depicting a second isometric view of the combined exemplary joint actuator assembly 10 and driven component 200 of FIG. 15. It will be appreciated that the joint actuator assembly 10 may be configured according to any of the embodiments. FIG. 17 is a drawing depicting an isometric view of the exemplary driven component 200 of FIGS. 15 and 16 in isolation.

Generally, the actuator assembly and the driven component may be combined into a mobility device comprising the actuator assembly including the rotating driving member, and a driven component that is driven by the rotating driving member, wherein the actuator assembly and the driven component are magnetically coupled by a magnetic coupling system. The magnetic coupling system may include a first magnetic coupling on the actuator assembly that magnetically couples to a second magnetic coupling on the driven component, the magnetic coupling system including a plurality of magnetic elements located as part of one or both of the first and second magnetic couplings. The first magnetic coupling has a first mating surface and the second magnetic coupling has a second mating surface that join when the magnetic coupling system is in a coupled position.

The first magnetic coupling on the actuator assembly is described above with reference to FIGS. 12-14. As detailed above, the first magnetic coupling may include a plurality of recessed pockets, and the second magnetic coupling (described in more detail below) has a plurality of raised mating features that respectively extend into the recessed pockets when the magnetic coupling system is in the coupled position.

Referring to FIGS. 15-17, the driven component 200 may include a coupling portion 202 that includes a plurality of raised mating features 204. In the example of the figures, six raised mating features are employed to engage with the six recessed pockets, although as referenced above any suitable number may be employed.

The mating features 204 each may be configured as a raised mating protrusion that is shaped for magnetic coupling with a respective one of the recessed pockets 50. Accordingly, each raised mating feature 204 may include a second mating surface 206 extending from a base surface 203 of the coupling portion toward an end of the raised mating feature, which essentially matches the first mating surface 54 of a respective recessed pocket 50 of the output reel. In this manner, the first mating surfaces 54 and the second mating surfaces 206 engage when the magnetic coupling system is in the coupled position.

In exemplary embodiments, the first mating surface and the second mating surface are opposing tapered mating surfaces. Accordingly, as best seen in the isolated depiction in FIG. 17, the second mating surface 206 may be a stepped surface that is stepped oppositely relative to the stepped configuration of the first mating surface 54. The stepped second mating surface 206 thus may include a plurality of opposing ridges 208 relative to the first mating surface that form a tapered configuration that aligns against the plurality of ridges 56 in the first mating surface. In this manner, the interaction of the ridges 56 and opposing ridges 208 provide a mechanical interface that results in a secure coupling that precludes any sliding movement of the driven component 200 relative to the output reel 32 of the actuator assembly 10.

Any number of the raised mating features 204 may include a respective second magnetic element 210. Each second magnetic element 210 is used for magnetic coupling by interacting with a respective first magnetic element 52 of an aligned recessed pocket 50. In exemplary embodiments, the second magnetic element 210 similarly may be configured as a neodymium disc magnet installed in an end of the raised mating feature 204, with a polarity opposite to that of a respective first magnetic element 52 to provide magnetic coupling of the two components. As further detailed below, different numbers, combinations and alignments of first magnetic elements 52 with second magnetic elements 210 may be employed to achieve different magnetic coupling functionality. Generally, at least one of the recessed pockets includes a respective one of the plurality of magnetic elements located at a bottom of the recessed pocket, and/or at least one of the raised mating features includes a respective one of the plurality of magnetic elements located at an end of the raised mating feature.

The coupling portion 202 may be integrally attached to a body portion 207. The body portion 207 may constitute a primary component and support frame of an upper or lower limb component of the mobility device.

During assembly of the mobility device (i.e. donning), when the coupling portion 202 of the driven component 200 is placed in proximity to the rotational driving member (e.g., output reel 32) of the actuator assembly 10, the magnetic attraction between the magnetic elements 52 and 210 draws the two components together. The raised mating features 204 of the coupling portion of the driven component become mechanically engaged in the recessed pockets 50 of the output reel 32. Opposing first mating surfaces 54 and second mating surfaces 206 engage with each other for a secure coupling. Accordingly, once the two components are drawn together by magnetic coupling, a mechanical interface of the step features and/or taper of the second mating surfaces of the driven component against the step features and/or opposing taper of the first mating surfaces of the recessed pockets of the output reel 32 handles the torque loads applied to the actuator assembly. In this manner, although the magnetic coupling aids in donning, the principal torque accommodation is performed by the mechanical interface of the opposing mating surfaces. As described above, to attain the mechanical interface the recessed pockets 50 and cooperating raised mating features 204 form matching tapers, which may be oriented at approximately 15 degrees relative to a normal line. The mechanical interface thus also provides mechanical keying that eases component alignment during donning in addition to handling the torque loads during use.

To further enhance the self-aligning capability of the magnetic coupling system, the magnetic elements may be positioned to provide a magnetic keying system for proper alignment of the rotating driving member and the driven component. The magnetic keying may be achieved by the magnetic elements in each of the rotational driving member (output reel 32) and the driven component being installed with alternating and opposite polarity. In other words, a first magnetic element 52 may be installed in the output reel with the north pole facing out; a next adjacent first magnetic element 52 may be installed with the south pole facing out; and so on in alternating fashion. The coupling portion of the driven component similarly would have second magnetic elements 210 installed with alternating polarity, and of opposite polarity to the magnetic elements of the recessed pockets to achieve a strong magnetic coupling. In this way, the magnetic coupling system has magnetic keying that actively forces the two components apart if the user is attempting to make the coupling in the wrong orientation or with an incorrect alignment of the recessed pockets 50 and mating features 204.

In an exemplary embodiment, the magnetic connections each have a holding force of approximately six pounds, for a total coupling force of approximately 36 pounds in an example of six magnetic couplings as shown in the figures. The precise number and individual strength of each coupling may be varied as suitable for particular circumstances. In addition to the magnetic polarity keying, which discourages misalignment during donning, enhanced mechanical keying may be achieved with the mating surfaces of the recessed pockets and raised mating features. To achieve enhanced mechanical keying, the recessed pockets of the rotational driving member may be arranged in a non-uniform pattern of differing first mating surfaces 54 that matches an opposing non-uniform pattern of the second mating surfaces 206 of the mating features of the driven element. The patterning of the mechanical interface of the mating surfaces thus also results in mechanical keying that precludes an improper alignment and engagement between the two components of the coupling system. In this manner, the coupling system may be both mechanically and magnetically keyed to ensure proper alignment and engagement of the components during donning.

In another exemplary embodiment, one side of the coupling system may be loaded with ferrous discs (e.g. steel) rather than magnetic elements. In other words, one of the actuator assembly and the drive component includes magnetic elements, and the other of the actuator assembly and the drive component includes ferrous discs as elements 52 or 210 opposing the magnetic elements. This configuration could possibly enable connecting in a variety of orientations if desired, in contrast to the precise keying of the previous embodiment. Such configuration also may reduce the mating impact of the coupling components as they come together, as the attractive force of magnet to steel decays more quickly with distance than that of magnet to magnet. Connecting in a variety of orientations also could be achieved by maintaining a uniform opposing polarity convention for all magnetic elements in each of the actuator assembly and driven component, in contrast to the previous embodiment in which each of the rotational driving member and the driven component having an alternating magnetic polarity. In other words, in each of the rotational driving member and the driven component the polarity may be the same for all magnetic elements, i.e., north pole facing out for all magnetic elements in the rotational driving component and south pole facing out for all magnetic elements in the driven component, or vice versa. In yet another exemplary embodiment, the magnetic elements may be used to assist with alignment and engagement during assembly and donning, and an additional locking feature may be present to positively engage the coupling of the two components, and/or aid in handling the torque loading and/or separation forces during use.

The joint actuator assembly generally may be incorporated into a mobility device including a joint component acting as the driven component, and the actuator assembly, wherein the actuator assembly drives the joint component. The mobility device may be any suitable powered mobility device, such as a powered orthotic device, prosthetic device, or legged mobility device.

In exemplary embodiments, the mobility device may be a legged mobility exoskeleton device comparable as the device depicted in FIGS. 1-11. Such exoskeleton device may include a hip component, at least one lower leg assembly, and at least one thigh assembly connected to the hip assembly at a hip joint and connected to the at least one lower leg assembly at a knee joint. The at least one thigh assembly may include a first actuator assembly that drives the hip joint, and a second actuator assembly that drives the knee joint. In an exemplary full exoskeleton device with left and right side components, the at least one lower leg assembly includes a left lower leg assembly and a right lower leg assembly. The at least one thigh assembly includes a left thigh assembly connected to the hip assembly at a left hip joint and to the left lower leg assembly at a left knee joint, and a right thigh assembly connected to the hip assembly at a right hip joint and to the right lower leg assembly at a right knee joint. The left thigh assembly includes a first actuator assembly that drives the left hip joint, and a second actuator assembly that drives the left knee joint. The right thigh assembly similarly includes a third actuator assembly that drives the right hip joint, and a fourth actuator assembly that drives the right knee joint.

An aspect of the invention, therefore, is a joint actuator assembly having an enhanced magnetic coupling system. In exemplary embodiments, the joint actuator assembly may include a motor; a rotating driving member driven by the motor for driving a driven component; and a transmission assembly located between the motor and the rotating driving member that provides a speed reduction from the motor to the rotating driving member. The rotating driving member comprises a magnetic coupling including a plurality of magnetic elements that are configured to magnetically couple with an opposing magnetic coupling of the driven component. The joint actuator assembly may include one or more of the following features, either individually or in combination.

In an exemplary embodiment of the joint actuator assembly, the magnetic coupling comprises a plurality of recessed pockets, and at least one of the recessed pockets includes a respective one of the plurality of magnetic elements located at a bottom of the recessed pocket.

In an exemplary embodiment of the joint actuator assembly, each recessed pocket includes a mating surface extending from an outer surface the rotating driving member toward a bottom of the recessed pocket.

In an exemplary embodiment of the joint actuator assembly, the mating surface is a tapered mating surface.

In an exemplary embodiment of the joint actuator assembly, the tapered mating surface is stepped with a plurality of ridges.

In an exemplary embodiment of the joint actuator assembly, the mating surfaces of the recessed pockets are non-uniform relative to each other.

In an exemplary embodiment of the joint actuator assembly, each recessed pocket includes a respective one of the plurality of magnetic elements.

In an exemplary embodiment of the joint actuator assembly, the magnetic coupling comprises six recessed pockets spaced equidistantly around the rotating driving member.

In an exemplary embodiment of the joint actuator assembly, the magnetic coupling further comprises six magnetic elements located respectively in each of the six recessed pockets.

In an exemplary embodiment of the joint actuator assembly, the magnetic elements are neodymium disc magnets.

In an exemplary embodiment of the joint actuator assembly, the rotating driving member comprises an output reel of a final stage of the transmission assembly.

Another aspect of the invention is a mobility device including a joint actuator assembly and a driven component that are coupled together by an enhanced magnetic coupling system. In exemplary embodiments, the mobility device includes an actuator assembly including a rotating driving member; a driven component that is driven by the rotating driving member; and a magnetic coupling system. The magnetic coupling system includes a first magnetic coupling on the actuator assembly that magnetically couples to a second magnetic coupling on the driven component, the magnetic coupling system including a plurality of magnetic elements located as part of one or both of the first and second magnetic couplings. The first magnetic coupling has a first mating surface and the second magnetic coupling has a second mating surface that join when the magnetic coupling system is in a coupled position. The joint mobility device may include one or more of the following features, either individually or in combination.

In an exemplary embodiment of the mobility device, the first magnetic coupling comprises a plurality of recessed pockets and the second magnetic coupling has a plurality of raised mating features that respectively extend into the recessed pockets when the magnetic coupling system is in the coupled position.

In an exemplary embodiment of the mobility device, at least one of the recessed pockets includes a respective one of the plurality of magnetic elements located at a bottom of the recessed pocket, and/or at least one of the raised mating features includes a respective one of the plurality of magnetic elements located at an end of the raised mating feature.

In an exemplary embodiment of the mobility device, each recessed pocket includes a first mating surface extending from an outer surface the rotating driving member toward a bottom of the recessed pocket; each raised mating feature includes a second mating surface extending from a base surface of the driven component toward an end of the raised mating feature; and the first mating surface and the second mating surface engage when the magnetic coupling system is in the coupled position.

In an exemplary embodiment of the mobility device, the first mating surface and the second mating surface are opposing tapered mating surfaces.

In an exemplary embodiment of the mobility device, the tapered mating surface of the first mating surface is stepped with a plurality of ridges, and the tapered mating surface of the second mating surface is stepped with a plurality of opposing ridges relative to the first mating surface.

In an exemplary embodiment of the mobility device, the first mating surfaces of the recessed pockets are non-uniform relative to each other, and the second mating surfaces of the raised mating features are non-uniform relative to each other in a manner opposing the first mating surfaces.

In an exemplary embodiment of the mobility device, the first mating surface and the second mating surface comprise a mechanical interface that handles torque loads applied to the actuator assembly, and that provides mechanical keying that aligns the actuator assembly and the driven component.

In an exemplary embodiment of the mobility device, each recessed pocket includes a respective one of the plurality of magnetic elements.

In an exemplary embodiment of the mobility device, each raised mating feature includes a respective one of the plurality of magnetic elements of opposite polarity relative to a magnetic element of an opposing recessed pocket.

In an exemplary embodiment of the mobility device, in the rotating driving member polarity is the same for all magnetic elements, and in the driven component polarity is the same for all magnetic elements and opposite to the polarity of the magnetic elements in the rotating driving member.

In an exemplary embodiment of the mobility device, the magnetic coupling system comprises a magnetic keying system that aligns the rotating driving member and the driven component, the magnetic keying system including magnetic elements in each of the rotating driving member and the driven component being installed with alternating and opposite polarity.

In an exemplary embodiment of the mobility device, one of the actuator assembly and the drive component includes magnetic elements, and the other of the actuator assembly and the drive component includes ferrous discs opposing the magnetic elements.

In an exemplary embodiment of the mobility device, magnetic coupling system comprises six recessed pockets spaced equidistantly around the rotating driving member, and six opposing raised mating features on the driven component.

In an exemplary embodiment of the mobility device, the magnetic elements are neodymium disc magnets.

In an exemplary embodiment of the mobility device, the rotating driving member comprises an output reel of the actuator assembly that drives the driven component.

In an exemplary embodiment of the mobility device, the mobility device is a legged mobility exoskeleton device comprising: a hip component; at least one thigh assembly including the actuator assembly connected to the hip component at a hip joint; and the driven component is at least one lower leg assembly that is magnetically coupled to the at least one thigh assembly by the magnetic coupling system at a knee joint.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mobility device comprising:
    an actuator assembly including a rotating driving member;
    a driven component that is driven by the rotating driving member; and
    a magnetic coupling system comprising a first magnetic coupling on the actuator assembly that magnetically couples to a second magnetic coupling on the driven component, the magnetic coupling system including a plurality of magnetic elements located as part of one or both of the first and second magnetic couplings;
    wherein the first magnetic coupling has a first tapered mating surface and the second magnetic coupling has a second opposing tapered mating surface that join when the magnetic coupling system is in a coupled position, and a magnetic force of the plurality of magnetic elements joins the first tapered mating surface and the second opposing tapered mating surface such that the first tapered mating surface and the second opposing tapered mating surface form a mechanical interface that prevents sliding movement of the driven component relative to the actuator assembly.

2. The mobility device of claim 1, wherein the first magnetic coupling comprises a plurality of recessed pockets and the second magnetic coupling has a plurality of raised mating features that respectively extend into the recessed pockets when the magnetic coupling system is in the coupled position.

3. The mobility device of claim 2, wherein at least one of the recessed pockets includes a respective one of the plurality of magnetic elements located at a bottom of the recessed pocket, and/or at least one of the raised mating features includes a respective one of the plurality of magnetic elements located at an end of the raised mating feature.

4. The mobility device of claim 2, wherein:
    each recessed pocket includes the first tapered mating surface extending from an outer surface of the rotating driving member toward a bottom of the recessed pocket; and
    each raised mating feature includes the second opposing tapered mating surface extending from a base surface of the driven component toward an end of the raised mating feature.

5. The mobility device of claim 1, wherein the mechanical interface formed by the first tapered mating surface and the second opposing tapered mating surface provides mechanical keying that aligns the actuator assembly and the driven component.

6. The mobility device of claim 1, wherein in the rotating driving member polarity is the same for all magnetic elements, and in the driven component polarity is the same for all magnetic elements and opposite to the polarity of the magnetic elements in the rotating driving member.

7. The mobility device of claim 1, wherein the magnetic coupling system comprises a magnetic keying system that aligns the rotating driving member and the driven component, the magnetic keying system including magnetic elements in each of the rotating driving member and the driven component being installed with alternating and opposite polarity.

8. The mobility device of claim 1, wherein one of the actuator assembly and the drive component includes magnetic elements, and the other of the actuator assembly and the drive component includes ferrous discs opposing the magnetic elements.

9. The mobility of claim 1, wherein the rotating driving member comprises an output reel of the actuator assembly that drives the driven component.

10. The mobility device of claim 1, wherein the mobility device is a legged mobility exoskeleton device comprising:
    a hip component;
    at least one thigh assembly including the actuator assembly connected to the hip component at a hip joint; and
    the driven component is at least one lower leg assembly that is magnetically coupled to the at least one thigh assembly by the magnetic coupling system at a knee joint.

11. A mobility device comprising:
    an actuator assembly including a rotating driving member;
    a driven component that is driven by the rotating driving member; and
    a magnetic coupling system comprising a first magnetic coupling on the actuator assembly that magnetically couples to a second magnetic coupling on the driven component, the magnetic coupling system including a plurality of magnetic elements located as part of one or both of the first and second magnetic couplings;
    wherein the first magnetic coupling has a first mating surface and the second magnetic coupling has a second mating surface that join when the magnetic coupling system is in a coupled position; and
    wherein the first mating and the second mating surface are opposing tapered mating surfaces, and the tapered mating surface of the first mating surface is stepped with a plurality of ridges and the tapered mating surface of the second mating surface is stepped with plurality of opposing ridges relative to the first mating surface, and the mating surfaces form a mechanical interface that results in a secure coupling that preclude any sliding movement of the driven component relative to the actuator assembly.

* * * * *